United States Patent
Mukai et al.

(10) Patent No.: US 9,454,221 B2
(45) Date of Patent: Sep. 27, 2016

(54) RENDERING PROCESSING DEVICE, CONTROL DEVICE, AND REMOTE CONTROL DEVICE

(71) Applicants: Takuya Mukai, Tokyo (JP); Tomoaki Gyota, Tokyo (JP); Yoshiaki Koizumi, Tokyo (JP); Masanori Nakata, Tokyo (JP); Noriyuki Kushiro, Tokyo (JP)

(72) Inventors: Takuya Mukai, Tokyo (JP); Tomoaki Gyota, Tokyo (JP); Yoshiaki Koizumi, Tokyo (JP); Masanori Nakata, Tokyo (JP); Noriyuki Kushiro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 102 days.

(21) Appl. No.: 14/358,819

(22) PCT Filed: Nov. 22, 2012

(86) PCT No.: PCT/JP2012/080331
§ 371 (c)(1),
(2) Date: May 16, 2014

(87) PCT Pub. No.: WO2013/084728
PCT Pub. Date: Jun. 13, 2013

(65) Prior Publication Data
US 2014/0306887 A1    Oct. 16, 2014

(30) Foreign Application Priority Data

Dec. 7, 2011    (JP) .................... 2011-267504

(51) Int. Cl.
*G06F 13/12*    (2006.01)
*G06F 3/01*    (2006.01)
(Continued)

(52) U.S. Cl.
CPC .................. *G06F 3/01* (2013.01); *G06F 3/048* (2013.01); *G09G 5/36* (2013.01); *G09G 5/393* (2013.01); *G09G 5/34* (2013.01); *G09G 2354/00* (2013.01)

(58) Field of Classification Search
CPC ......... G06F 3/01; G06F 3/048; G09G 5/393; G09G 5/36; G09G 5/34; G09G 2354/00
See application file for complete search history.

(56) References Cited

U.S. PATENT DOCUMENTS 4,783,648 A * 11/1988 Homma .................. G09G 5/14
715/794
5,642,509 A    6/1997 Ohshima et al.
(Continued)

FOREIGN PATENT DOCUMENTS

EP    2 383 728 A1    11/2011
JP    62-103687 A    5/1987
(Continued)

OTHER PUBLICATIONS

Office Action mailed Sep. 24, 2015 in the corresponding JP application No. 2013-548174 (with English Translation).
(Continued)

*Primary Examiner* — Jing-Yih Shyu
(74) *Attorney, Agent, or Firm* — Posz Law Group, PLC

(57) ABSTRACT

A control device includes a storage device for prestoring rendering command data, a central processing device, and a rendering processing device. The rendering command data is data for generating a rendering command executed in order to generate display data indicating a display image to be displayed on a display device. The central processing device refers to a screen management table when a predetermined rendering condition is satisfied, and specifies and outputs rendering command specifying data corresponding to the satisfied rendering condition. The rendering processing device acquires the rendering command data specified by the outputted rendering command specifying data from storage device, generates display data based on the acquired rendering command data, and outputs the display data to the display device.

11 Claims, 18 Drawing Sheets

(51) Int. Cl.
   *G06F 3/048* (2013.01)
   *G09G 5/36* (2006.01)
   *G09G 5/393* (2006.01)
   *G09G 5/34* (2006.01)

(56) References Cited

U.S. PATENT DOCUMENTS

| | | | | |
|---|---|---|---|---|
| 5,664,163 A * | 9/1997 | Yutaka | G06T 15/005 | 345/501 |
| 6,466,233 B1 * | 10/2002 | Mitani | H04N 5/44582 | 348/E5.103 |
| 7,802,196 B2 * | 9/2010 | Brunner | G06F 3/0485 | 345/545 |
| 2001/0024205 A1 * | 9/2001 | Kishi | G06T 17/00 | 345/520 |
| 2009/0303557 A1 * | 12/2009 | Nishimura | H04N 1/00408 | 358/527 |
| 2011/0169866 A1 * | 7/2011 | Yoshikawa | A63F 13/10 | 345/660 |
| 2011/0234607 A1 * | 9/2011 | Katsukura | G08C 17/00 | 345/522 |
| 2011/0249009 A1 * | 10/2011 | Nakata | G09G 5/026 | 345/501 |
| 2012/0206466 A1 * | 8/2012 | Sharp | G06T 1/60 | 345/543 |

FOREIGN PATENT DOCUMENTS

| | | |
|---|---|---|
| JP | 05-035835 A | 2/1993 |
| JP | 06-266666 A | 9/1994 |
| JP | 10-177493 A | 6/1998 |
| JP | 2010-171776 A | 8/2010 |
| JP | 2010-175105 A | 8/2010 |
| JP | 2010-175638 A | 8/2010 |

OTHER PUBLICATIONS

Office Action mailed Feb. 17, 2015 issued in corresponding JP patent application No. 2013-548174 (and English translation).
International Search Report of the International Searching Authority mailed Feb. 26, 2013 for the corresponding international application No. PCT/JP2012/080331 (and English translation).
Extended European Search Report mailed Jun. 2, 2015 in the corresponding EP application No. 12856152.9.
Office Action issued Nov. 4, 2015 in the corresponding CN application No. 201280060053.1 (with partial English translation).

* cited by examiner

| SCREEN MANAGEMENT TABLE | | | | | | |
|---|---|---|---|---|---|---|
| SCREEN NUMBER | RENDERING COMMAND ADDRESS | OPERATION TYPE | | | | |
| | | BUTTON 0 | BUTTON 1 | BUTTON 2 | ... | BUTTON N |
| 0 | AAAAA | 2 | 5 | 9 | | 4 |
| 1 | BBBBB | 6 | 3 | 10 | ... | 11 |
| 2 | CCCCC | 12 | 12 | 0 | | 7 |
| ⋮ | ⋮ | ⋮ | | ⋮ | | |
| N | MMMMM | 3 | 8 | 7 | ... | 2 |

FIG.13

SCREEN MANAGEMENT TABLE 341

| SCREEN NUMBER | RENDERING COMMAND ADDRESS | ELEMENT ADDRESS | | | | OPERATION TYPE | | | |
|---|---|---|---|---|---|---|---|---|---|
| | | | | ... | | BUTTON 0 | BUTTON 1 | BUTTON 2 | ... | BUTTON N |
| 0 | AAAAA | XXXX1 | ... | XXXXN | 2 | 5 | 9 | ... | 4 |
| 1 | BBBBB | YYYY1 | ... | YYYYN | 6 | 3 | 10 | ... | 11 |
| 2 | CCCCC | ZZZZ1 | ... | ZZZZN | 12 | 12 | 0 | ... | 7 |
| ... | ... | ... | ... | ... | ... | ... | ... | ... | ... |
| N | MMMMM | WWWW1 | ... | WWWWN | 3 | 8 | 7 | ... | 2 |

# RENDERING PROCESSING DEVICE, CONTROL DEVICE, AND REMOTE CONTROL DEVICE

CROSS REFERENCE TO RELATED APPLICATIONS

This application is a U.S. national stage application of International Application No. PCT/JP2012/080331 filed on Nov. 22, 2012, and is based on Japanese Patent Application No. 2011-267504 filed on Dec. 7, 2011, the disclosures of which are incorporated herein by reference.

TECHNICAL FIELD

The present disclosure relates to a control device which displays an image and a remote control device.

BACKGROUND ART

Conventionally, a user interface for switching displaying/hiding a character or a figure printed on a screen has been adopted for a remote control device for operating home electric appliances, equipment, or the like. Recently, a demand for a remote control device to display an image representing a figure, a character, or the like on a full dot liquid crystal display, and to provide a simple user interface is ever-increasing. On the other hand, a processing load for rendering an image becomes large, and due to execution of rendering processing, there have been problems such as delay in controlling home electric appliances, equipment, or the like using a remote control device, or increase in storage capacity for storing images. For reducing the processing load of a central processing device, for example, Patent Literature 1 discloses a technique of mounting a rendering processing device inside the central processing device or outside the central processing device as a hardware exclusively for executing a rendering processing.

CITATION LIST

Patent Literature

Patent Literature 1: Unexamined Japanese Patent Application Kokai Publication No. 2010-175638

SUMMARY OF INVENTION

Technical Problem

However, in the technique described in Patent Literature 1, the use of a central processing device in which a rendering processing device is mounted entails a type change from a conventionally used central processing device to another central processing device. When the type of a central processing device is changed, a program which a central processing device executes is needed to be newly developed from scratch, which requires a long development time for the product in many cases. Particularly in many cases of programs for remote control devices controlling home electric appliances or equipment, bug fixing over the years ensures a high reliability of the programs. Therefore, newly developing such a program may cause a reliability problem.

When a rendering processing device is mounted outside the central processing device, although the central processing device needs not to be changed, the central processing device generates a rendering request (corresponding to a rendering command in Embodiments) to generate a writing processing into a storage device (RAM). When a particularly complicated image is rendered, the data size of a rendering request becomes large, and a load for a generation processing or writing processing becomes high, whereby processings other than rendering such as controlling home electric appliances or equipment may considerably delay. In addition, since more than a small amount of time is consumed for generating or writing a rendering request during the execution of a program controlled by home electric appliances or equipment, verification of timing of the program or the like is again needed. Further, a program is needed to be redeveloped as required.

The disclosure has been made under the above circumstances, and aims at providing a control device and a remote control device in which a processing load of a central processing device for displaying a display image on a screen can be reduced without substantially changing an existing central processing device or existing program.

Solution to Problem

In order to attain the above objective, a control device of the disclosure comprises:

a display device for displaying on a screen a display image indicated by display data;

a storage device for prestoring rendering command data for generating a rendering command that is a command executed for generating the display data;

a central processing device for prestoring a screen management table in which rendering condition data indicating a predetermined rendering condition as a condition for executing the rendering command and rendering command specifying data for specifying the rendering command data are associated with, for specifying, by referring to the screen management table when the rendering condition is satisfied, the rendering command specifying data associated with rendering condition data indicating the satisfied rendering condition, and for outputting the specified rendering command specifying data; and a rendering processing device for acquiring the rendering command data specified by rendering command specifying data outputted from the central processing device from the storage device, for generating the display data by executing rendering command generated based on the acquired rendering command data, and for outputting the generated display data to the display device.

Advantageous Effects of Invention

By the disclosure, processing load on the central processing device for displaying a display image on a screen can be reduced without substantially changing an existing central processing device or existing program.

BRIEF DESCRIPTION OF RENDERINGS

FIG. 4 is a diagram illustrating one example of a screen management table of Embodiment 1;

FIG. 13 is a diagram illustrating one example of a screen management table of Modified Embodiment 2;

DESCRIPTION OF EMBODIMENTS

Figure 1:
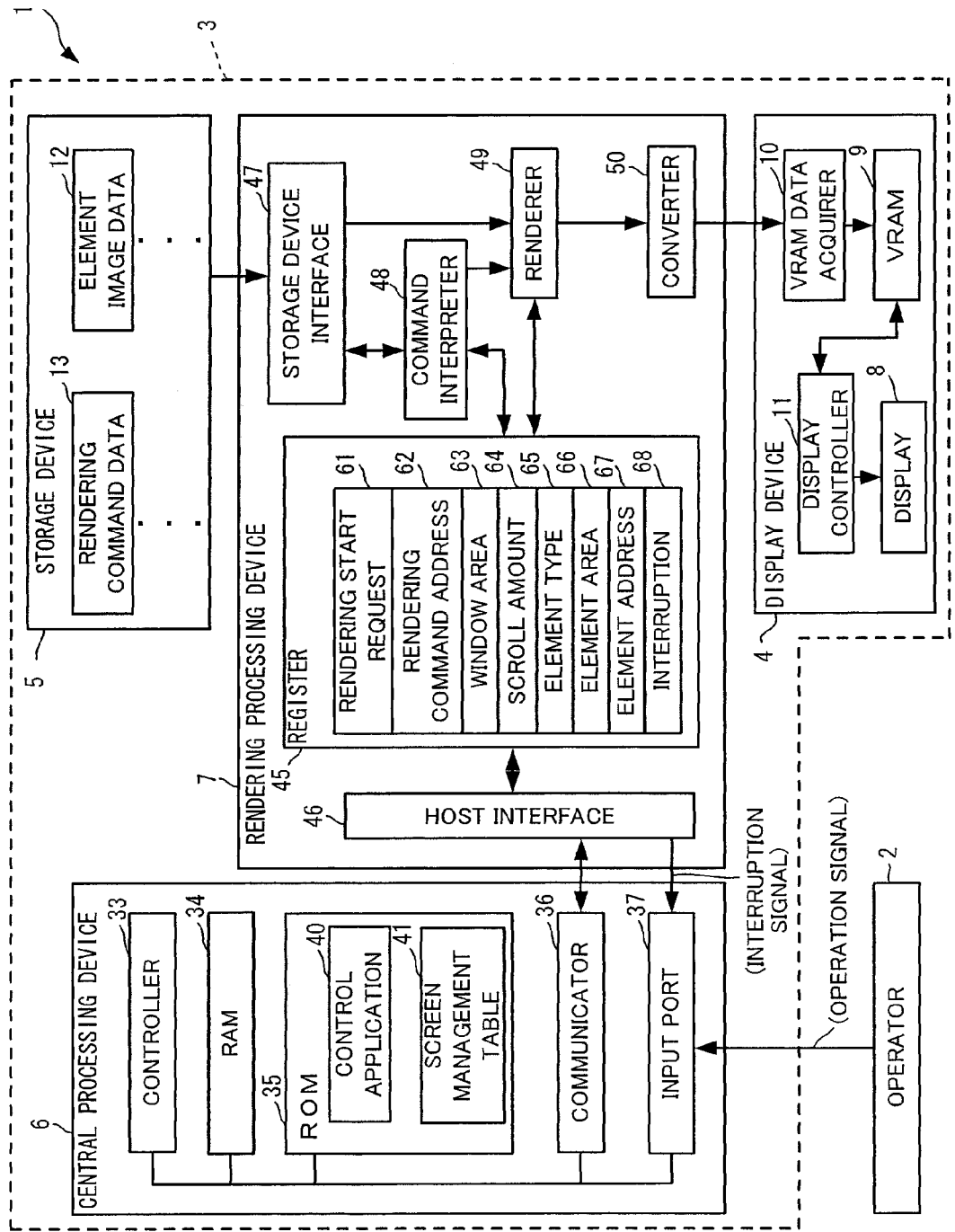
FIG. 1 is a diagram illustrating the constitution of a remote control device of Embodiment 1.

Embodiments of the disclosure will now be described with reference to drawings. Throughout all the drawings, the same element is designated by the same reference numeral. Overlapping description for the same element will be omitted.

Embodiment 1

A remote control device of Embodiment 1 of the disclosure is a device for a user to operate an air conditioner. It noted that the air conditioner is one example of a variety of appliances, and an object to be operated by the remote control device may be home electric appliances, equipment such as illumination, or security system, or the like.

The remote control device 1 of the present Embodiment comprises an operator 2 and a control device 3 as illustrated in FIG. 1.

The operator 2 includes a part which a user operates, and outputs an operation signal. The operator 2 of the present Embodiment comprises a plurality of buttons which a user operates by pushing, and outputs an operation signal according to the pushed button. It is noted that the operator 2 may be, for example, a lever or a touch panel.

The control device 3 is a device for generally controlling the remote control device 1, and comprises a display device 4, a storage device 5, a central processing device 6, and a rendering processing device 7 as illustrated in FIG. 1.

The display device 4 is a device which displays a display image on a screen, and comprises a display 8, a VRAM (Video Random Access Memory) 9, a VRAM data acquirer 10, and a display controller 11 as illustrated in FIG. 1.

The display 8 is, for example, a 32-level gray scale full dot type liquid crystal device, which displays an image with a certain number of pixels on a screen with a certain size. It is noted that the display 8 may be a color support display. The VRAM 9 is a RAM holding VRAM data (display data). The VRAM data acquirer 10 is an interface which acquires VRAM data outputted from the rendering processing device 7, and stores the acquired VRAM data in VRAM 9. The display controller 11 acquires VRAM data stored in the VRAM 9 at a regular interval, and displays a display image indicated by the acquired VRAM data on a screen of the display 8.

The storage device 5 is a device which stores a variety of data, and comprises an EEPROM (Electrically Erasable Programmable Read-Only Memory), a serial flash ROM (Read Only Memory), a parallel flash ROM, or the like.

The storage device 5 stores each of element image data 12 and rendering command data 13 at a predetermined address as illustrated in FIG. 1.

The element image data 12 includes an image (element image) representing an element such as a character, a symbol, or a figure contained in a display image displayed on the whole or a part (window) of the screen of the display 8.

The term "element image" refers to, for example, the images representing characters "冷" and "房" which together mean "冷房 (cooling)", numbers from "0" to "9" representing a target temperature, an image representing "° C.", and an image representing the quantity of air. It is noted that one element image may be constituted by a plurality of characters such as "冷房", or an element image may be a background image.

The rendering command data 13 includes data needed for generating a command (rendering command) executed for generating display data indicating a display image. The rendering command data 13 includes a window area setting command 14, an element rendering command 15, and a termination command 16 indicating a termination of the rendering command data 13, as illustrated in FIG. 2.

The window area setting command 14 is a command for setting a window area in a virtual area which is the largest area that the rendering processing device 7 can deal with. As illustrated in FIG. 2, the window area setting command 14 includes: a header 17 indicating that an element of the window area setting command 14 follows, or the like; and virtual area coordinate values 18 to 21 indicating the position in the virtual area where a rectangular window area is set.

Figure 2:
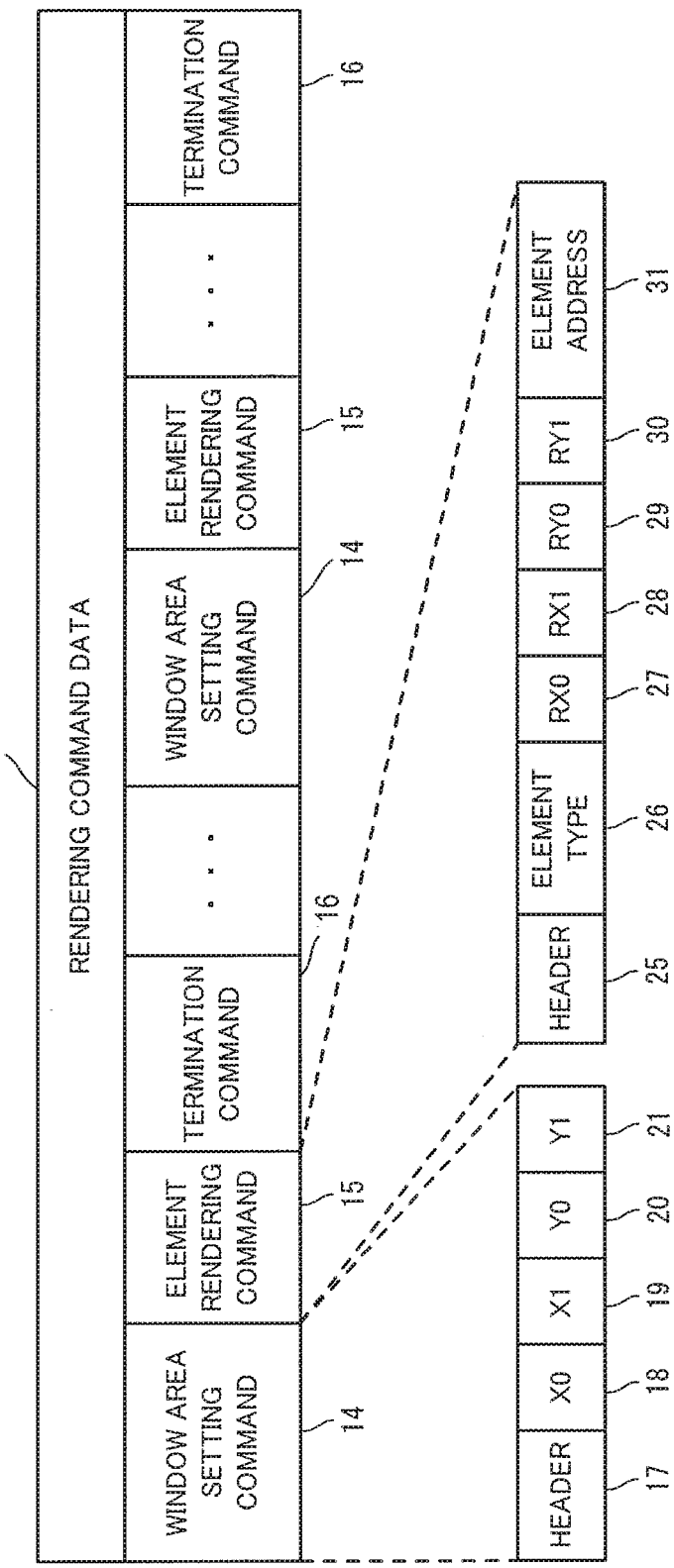
FIG. 2 is a diagram illustrating one example of rendering command data of Embodiment 1.

The virtual area coordinate values 18 to 21 included in the first (left in FIG. 2) window area setting command 14 illustrated in FIG. 2 represent a rectangular area (X0, X1, Y0, Y1). Here, the rectangular area (X0, X1, Y0, Y1) represents a rectangular area whose minimum value of a virtual area coordinate value in the X direction is X0 and maximum value is X1, and whose minimum value of a virtual area coordinate value in the Y direction is Y0 and maximum value is Y1.

Figure 3:
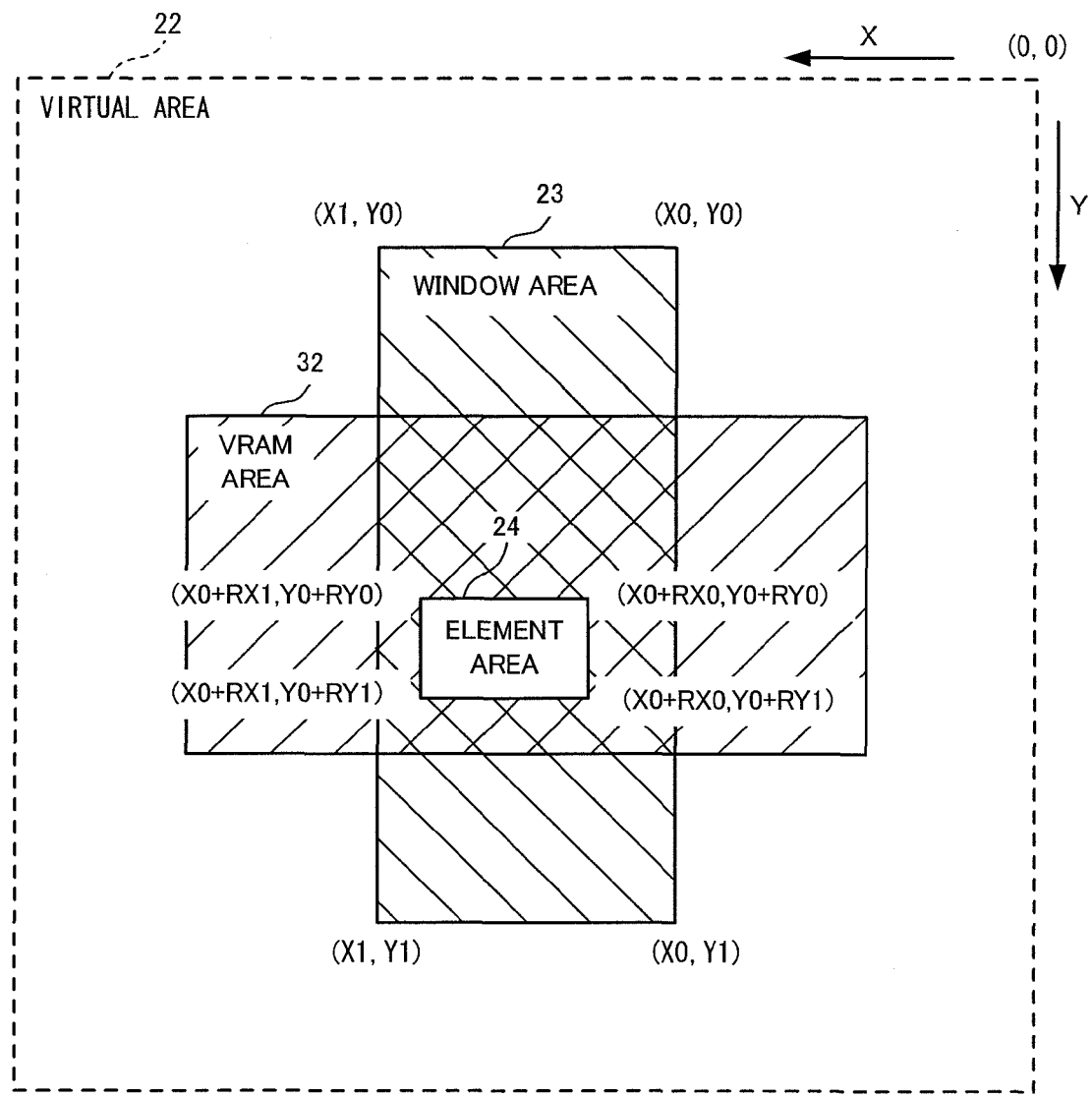
FIG. 3 is a diagram illustrating one example of the relationship between areas used for generating display data by a rendering processing device.

FIG. 3 shows an example of a window area 23 which is set as a virtual area 22 according to the first window area setting command 14. The virtual area coordinate value (X, Y) of the present Embodiment is represented by a virtual area coordinate system setting the upper-right in FIG. 3 to the origin, right and left to the X direction, and up and down to the Y direction, as illustrated in FIG. 3.

The element rendering command 15 is a command for arranging in the window area 23 an element area 24 which is a rectangular area which circumscribes an element image.

It is noted that the element area 24 is not limited to a rectangle, and a circle, eclipse, or the like may be appropriately adopted. The element rendering command 15 includes a header 25, an element type 26, relative coordinate values 27 to 30, and an element address 31, as illustrated in FIG. 2.

The header 25 indicates that an element such as the element rendering command 15 follows. The element type 26 indicates the type of image compression adopted for the element image data 12 such as GIF or JPEG. The relative coordinate values 27 to 30 indicate the position where the element area 24 is arranged in the window area 23. The element address 31 indicates the address where the element image data 12 is stored in the storage device 5.

The relative coordinate values 27 to 30 included in the element rendering command 15 followed by the first window area setting command 14 illustrated in FIG. 2 represents a rectangular area (RX0, RX1, RY0, RY1) whose minimum value of a relative coordinate value in the X direction is RX0, and the maximum value is RX1, and whose minimum value of a relative coordinate value in the Y direction is RY0, and the maximum value is RY1.

The relative coordinate value means a coordinate value indicating the position in a window area set by the window area setting command 14. The relative coordinate value (RX, RY) in the present Embodiment is represented by a relative coordinate system setting the virtual area coordinate (X0, Y0) at the upper-right corner of the window area 23 to the origin of the relative coordinate, right and left to the X direction, and up and down to the Y direction, as illustrated in FIG. 3. The element area 24 in FIG. 3 is an example of the element area 24 arranged by the relative coordinate values 27 to 30 included in the element rendering command 15 followed by the first window area setting command 14.

It is noted that a VRAM area (display area) 32 is an area corresponding to the screen of the display 8, and is set, for example, at the center of the virtual area 22 as illustrated in the FIG. 3. Accordingly, in FIG. 3, an image portion where the window area 23 and the VRAM area 32 overlap corresponds to a display image. In other words, the element image arranged at the overlapping portion of the window area 23 and the VRAM area 32 is displayed on the screen of the display 8. An element image which is arranged on the portion of the window area 23 which extends upward or downward from the VRAM area 32 is not displayed on the screen of the display 8, and when the window area 23 is scrolled, the element image is displayed on the screen of the display 8.

Referring back to FIG. 1, the central processing device (microcomputer) 6 is a device which generally controls the remote control device 1, and comprises a controller 33, a RAM (Random Access Memory) 34, a ROM 35, a communicator 36, and an input port 37.

The controller 33 interprets a software program (hereinafter, referred to as "program") read from the ROM 35, and performs arithmetic processing or control processing of peripheral functions such as the ROM 35, the RAM 34, the communicator 36, and the input port 37 according to the interpreted content.

The RAM 34 is a volatile memory used as a working area for the controller 33.

The ROM 35 is a nonvolatile memory which stores a program executed by the controller 33, and prestores a control application 40 and a screen management table 41.

The control application 40 is a program which performs a general control (main control) of the remote control device 1, or a control or operation of a device to be controlled.

The screen management table 41 stores rendering conditions for renewing contents on the screen and contents which is displayed on the screen when the rendering conditions are satisfied.

FIG. 4 illustrates one example of the screen management table 41. In the screen management table 41, a rendering command address and a screen number corresponding to the operation type are associated with for each screen number. The screen number is a number preassigned to an individual screen for the purpose of uniquely identifying the type of the screen such as an initial screen or an operation input screen. The rendering command address is an address on the storage device 5 which stores the rendering command data 13 for displaying the screen associated therewith. The operation type is the type of an operation which a user performs on the operator 2. The operation type indicates in the present Embodiment which button specified by buttons 0 to N is pushed. A screen number according to the operation type indicates a screen number of the screen to be displayed next in accordance with the type of an operation performed when the screen with the screen number associated therewith (the screen number indicated on the leftmost column in FIG. 4) is displayed. Herein, the above-mentioned rendering conditions correspond to the screen number which is displayed and the operation type; and the above-mentioned screen content correspond to the rendering command address. It is noted that the rendering command address is one example of the rendering command specifying data for specifying the rendering command data 13.

Referring back to FIG. 1, the communicator 36 is a communications interface which outputs a host command from the central processing device 6 to the rendering processing device 7, and which reads and writes register contents of the rendering processing device 7. Specific examples of a communications interface include a clock synchronous serial interface, an asynchronous serial communications interface, and a general-purpose bus interface.

The input port 37 detects an operation signal from the operator 2, an interruption signal from the rendering processing device 7, or the like.

The rendering processing device 7 comprises a register 45, a host interface 46, a storage device interface 47, a command interpreter 48, a renderer 49, and a converter 50 as illustrated in FIG. 1.

The register 45 stores information which the rendering processing device 7 uses for rendering processing. As illustrated in FIG. 1, the register 45 comprises a rendering start request register 61, a rendering command address register 62, a window area register 63, a scroll amount register 64, an element type register 65, an element area register 66, an element address register 67 and an interruption register 68.

The rendering start request register 61 is a register for the central processing device 6 to instruct the start of a rendering processing to the rendering processing device 7. The rendering command address register 62 is a register which sets an address on the storage device 5 storing the rendering command data 13 to be processed. The window area register 63 is a register for setting a window area indicated in a rendering command to be processed. The scroll amount register 64 is a register for setting the amount of movement (scroll amount) of the window area in the X direction and the Y direction. The element type register 65 is a register for setting the type of an element image to be rendered. The element area register 66 is a register for setting the coordinates (relative coordinates with respect to the window area) of the rendering destination of the element image to be rendered. The element address register 67 is a register for setting an address on the storage device 5 storing an element image to be rendered. The interruption register 68 is a register for setting a rendering end flag indicating a rendering end.

The host interface 46 reads and writes the contents of the register 45 at a prescribed position according to a host command received from the central processing device 6.

The host interface 46 outputs an interruption signal to the input port 37 of the central processing device 6 when a rendering end flag of the interruption register 68 is set.

The storage device interface 47 is an interface which acquires the rendering command data 13 or the element image data 12 from the storage device 5 per a predetermined data size unit (for example, 1 byte).

The command interpreter 48 monitors the rendering start request register 61. When a flag (rendering start flag) which instructs the start of the rendering processing is set to the rendering start request register 61, the command interpreter 48 acquires the rendering command data 13 from the storage device 5 via the storage device interface 47. Specifically, the command interpreter 48 acquires a series of rendering command data 13 stored in the storage device 5 from the address set in the rendering command address register 62.

And, the command interpreter 48 interprets the rendering command data 13 to store each piece of data included in the rendering command into the corresponding registers 63, 65 to 67. In this case, every time when the command interpreter 48 reads an element rendering command in the rendering command data 13, the command interpreter 48 performs an element rendering request notification to the renderer 49 and temporarily stops reading the rendering command data 13. After the rendering command data 13 receives the element rendering end notification from the renderer 49, the command interpreter 48 resumes reading the rendering command data 13. Here, the element rendering request notification is a notification indicating the request to start rendering an element image. The element rendering end notification is a notification indicating the end of rendering an element image.

When the renderer 49 receives the above-mentioned element rendering request notification, the renderer 49 performs a rendering processing for an element image. Specifically, the renderer 49 acquires the element image data 12 from the storage device 5 via the storage device interface 47 based on the address set in the element address register 67. The renderer 49 performs decompression processing in accordance with the image type indicated by an image type data stored in the element type register 65, thereby generating rendering data.

Further, referring to the window area register 63, the scroll amount register 64 and the element area register 66, the renderer 49 calculates the coordinate position of each pixel of the element image in the virtual area in accordance with the register 63, 64, 66 which have been referred to. The renderer 49 outputs the rendering data of the element image included in the VRAM area 32 to the converter 50 together with data indicating the coordinate position of each pixel. Specifically, the rendering data is data representing the pixel value of each pixel, and in the rendering data in the case of a monochromatic image, one pixel is represented by 1 bit (white, black).

Figure 5:
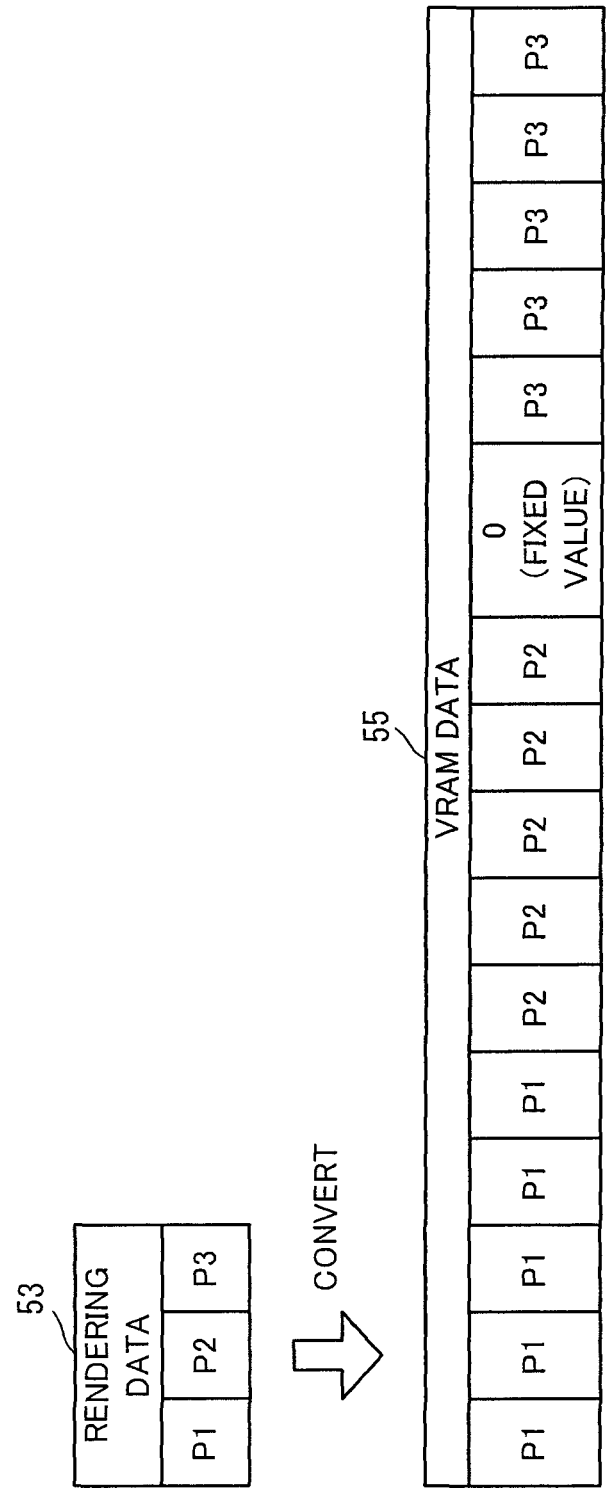
FIG. 5 is a diagram illustrating one example of a conversion processing executed by a converter.

The converter 50 converts rendering data inputted from the renderer 49 into VRAM data 55 in a data format supported by the display device 4. The converter 50 writes the converted VRAM data 55 on the position on the VRAM 9 corresponding to the coordinate position indicated by data inputted together with the rendering data via the VRAM data acquirer 10. In the conversion processing, for example, as illustrated in FIG. 5, rendering data 53 equivalent to three monochromatic pixels is converted into 16-bit VRAM data 55.

In the above, the constitution of the remote control device 1 according to Embodiment 1 of the disclosure is described. In the following, a processing which the remote control device 1 of the present Embodiment executes in operation is described with reference to figures.

Figure 6:
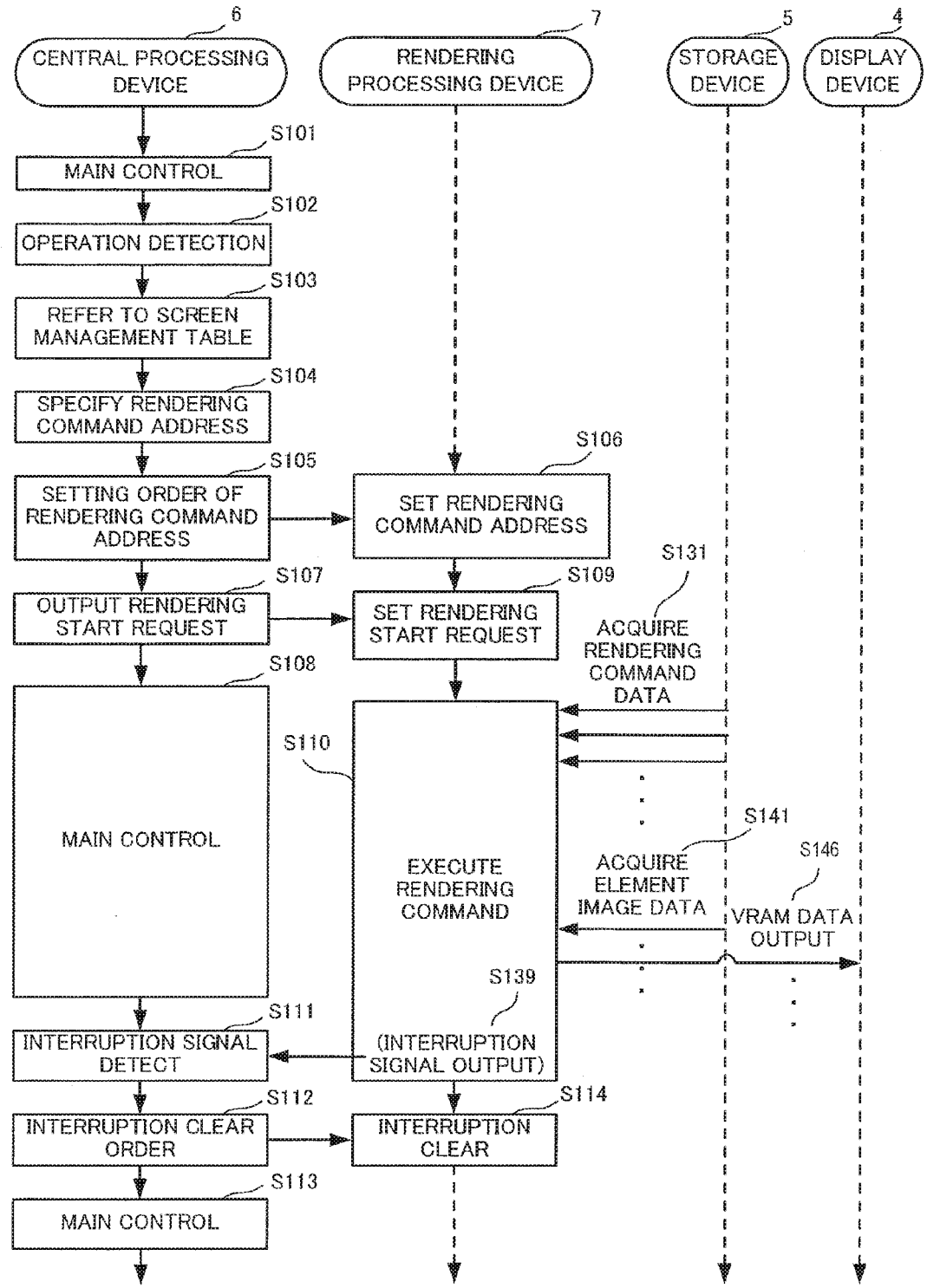
FIG. 6 is a diagram illustrating one example of a flow of processings executed by a remote control device of Embodiment 1.

As illustrated in FIG. 6, the central processing device 6 performs a main control processing by executing the control application 40 (step S101).

When a user operates the operator 2 during the execution of the main control processing (step S101), an operation signal is inputted to the input port 37. By this, the central processing device 6 detects the operation input by the user (step S102), and interrupts the main control processing.

The central processing device 6 refers to the screen management table 41 (step S103), and specifies the rendering command address of the next display screen in accordance with rendering conditions satisfied based on the screen number of a screen displayed on the display device 4 and the operation type indicated by the acquired operation signal (step S104).

Let, for example, the operation type indicated by an operation signal acquired by the central processing device 6 be "button 0", and the screen number of the display screen at that time be "0". Referring to the screen management table 41 shown in FIG. 4, the screen number of the display screen to be rendern next is "2". The central processing device 6 specifies that the rendering command address "CCCCC" associated with the screen number "2" is the rendering command address of the next display screen.

Next, the central processing device 6 outputs a host command setting the specified rendering command address to the rendering command address register 62 to the rendering processing device 7 via the communicator 36 (step S105). In this case, the central processing device 6 may thereafter set a certain value, for example, "0" to the scroll amount register 64.

The host interface 46 of the rendering processing device 7 sets a rendering command address according to the inputted host command to the rendering command address register 62 as illustrated in FIG. 6 (step S106).

Next, the central processing device 6 outputs a host command (rendering start request) which writes a rendering start flag on the rendering start request register 61 to the rendering processing device 7 (step S107). Then, the controller 33 resumes the interrupted main control processing (step S108).

The host interface 46 of the rendering processing device 7 sets a rendering start flag to the rendering start request register 61 in response to the input of the rendering start request (step S109).

The command interpreter 48 of the rendering processing device 7 which monitors the rendering start request register 61 performs a rendering command execution processing when a rendering start flag is detected to be set (step S110).

In the rendering command execution processing (S110) which is described in detail below, the rendering processing device 7 acquires the rendering command data 13 from the address of the storage device 5 indicated by the rendering command address register 62 (step S131) as illustrated in FIG. 6. Here, the rendering processing device 7 adds +1 to the content of the rendering command address register 62 every time the rendering processing device 7 acquires 1 byte of the rendering command data 13. By this, the command interpreter 48 can acquire the rendering command data 13 by 1 byte while referring to the rendering command address register 62. The rendering processing device 7 repeats either a processing for setting the window area or a processing for rendering an element image in accordance with the content of the sequentially acquired rendering command data 13 until the termination command 16 is acquired.

When the acquired rendering command data 13 is the element rendering command 15, the command interpreter 48 instructs the renderer 49 to start the rendering processing of an element image at the time when the acquisition of one element rendering command 15 is completed. The renderer 49 acquires the element image data 12 from the address indicated by the element address register 67 (step S141) as illustrated in FIG. 6. Here, the renderer 49 adds +1 to the content of the element address register 67 every time the renderer 49 acquires the element image data 12 by 1 byte, and acquires the element image data 12 by 1 byte while referring to the element address register 67. The renderer 49 generates the rendering data 53 by performing a decompression processing on the acquired element image data 12. The renderer 49 outputs the generated rendering data as well as data indicating the coordinate position of each pixel included in the element image indicated by the rendering data 53 to the converter 50 as needed.

Figure 8:
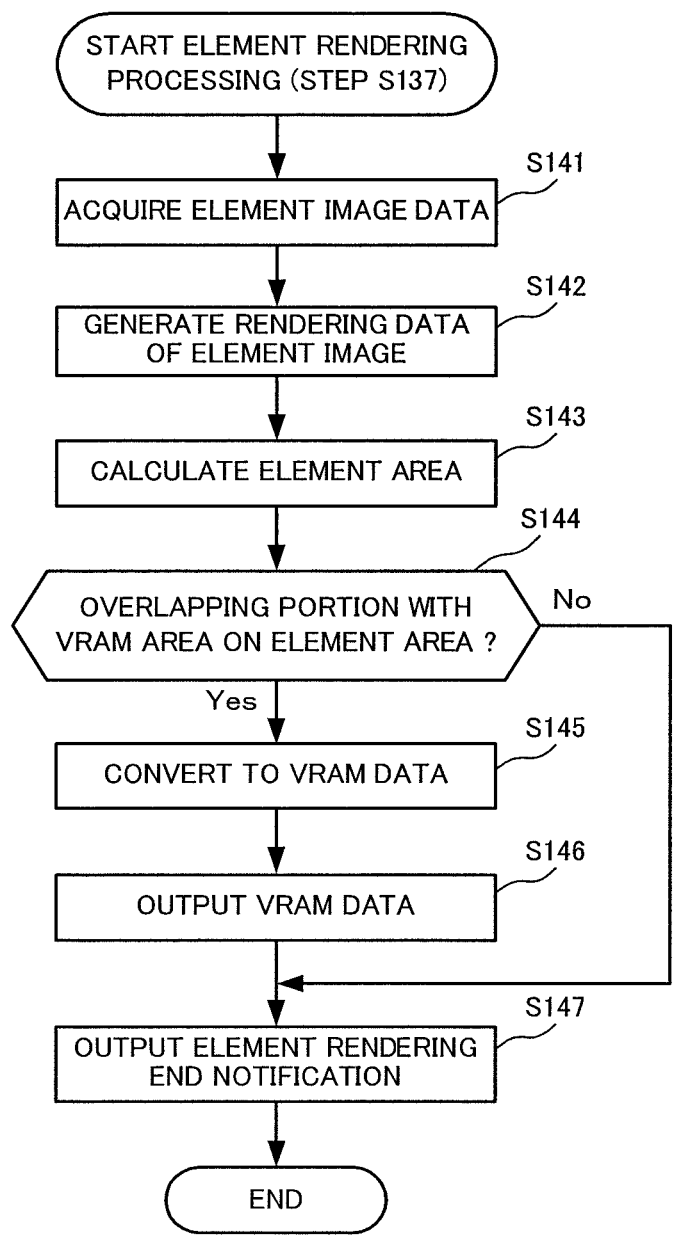
FIG. 8 is a flow chart illustrating the detail of an element rendering processing shown in FIG. 7.

The converter 50 converts the data format of the rendering data 53 into the VRAM data 55, and outputs the VRAM data 55 obtained by the conversion to the display device 4 (step S146 illustrated in FIG. 8). When processings for all pixels included in the element image data 12 which is processed are completed, the renderer 49 notifies the command interpreter 48 of an element rendering end notification. In response to the element rendering end notification, the command interpreter 48 resumes the acquisition of the rendering command data 13.

After the acquisition of the termination command 16, the command interpreter 48 sets a rendering end flag indicating that the rendering processing ends to the interruption register 68. By this, the host interface 46 detects the set rendering end flag, and outputs the interruption signal to the central processing device 6 (step S139).

When the interruption signal is detected (step S111), the central processing device 6 interrupts the main control processing, and outputs a host command for clearing the interruption register 68 (rendering end flag clear order) to the rendering processing device 7 via the communicator 36 (step S112). Then, the controller 33 resumes the main control processing (step S113).

When the host interface 46 of the rendering processing device 7 acquires an end interruption clear order from the central processing device 6, the host interface 46 clears the interruption register 68, and stops the interruption signal (step S114).

As seen from the above description, the processing executed by the central processing device 6 for displaying a display image on the display 8 include the processing from the operation detection processing (step S102) to the rendering start request output processing (step S107), the interruption signal acquisition processing (step S111), and the interruption clear order processing (step S112). These processings are considerably small compared with a conventional processing used to generate rendering command data. Accordingly, a processing load applied to the central processing device 6 for displaying a display image on the display 8 can be significantly reduced.

The detail of the rendering command execution processing executed by the rendering processing device 7 (step S110) will be described.

The rendering command execution processing (step S110) is started by the detection of a rendering start flag on the rendering start request register 61 by the command interpreter 48. The command interpreter 48 which has detected the rendering start flag acquires the rendering command data 13 arranged at the address stored in the rendering command address register 62 from the storage device 5 via the storage device interface 47 (step S131 as illustrated in FIG. 6).

Specifically, if the command interpreter 48 acquires 1 byte of the rendering command data 13 from the storage device 5 via the storage device interface 47, the command interpreter 48 adds +1 to the content of the rendering command address register 62. By repeating this, the command interpreter 48 acquires the rendering command data 13 by 1 byte. Although, in the following, the description relating to the repetition of the rendering command data acquisition processing will be omitted for ease of explanation, the following processing may be executed as appropriate while acquiring the rendering command data 13 by 1 byte.

Figure 7:
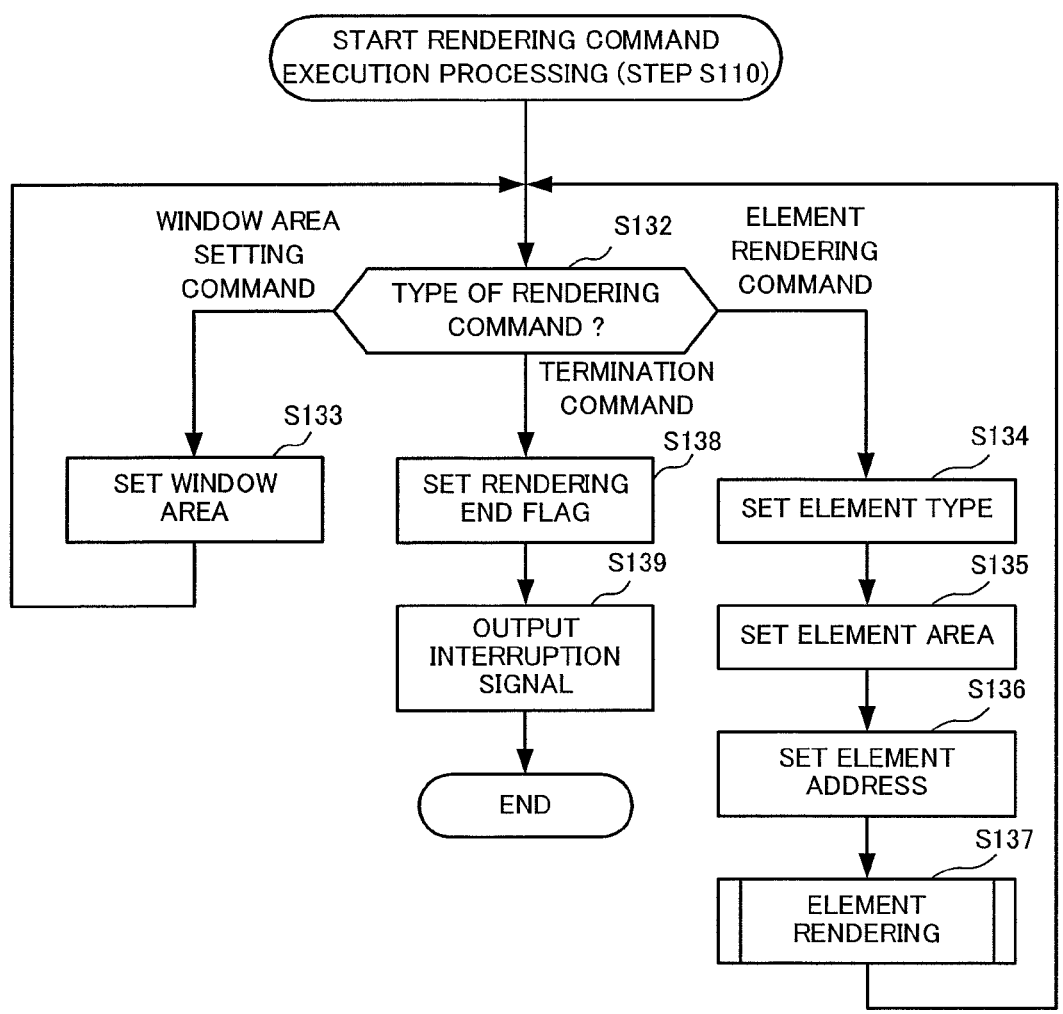
FIG. 7 is a flow chart illustrating the detail of the rendering command execution processing shown in FIG. 6.

As illustrated in FIG. 7, the command interpreter 48 interprets the headers 17, 25 included in the rendering command data 13, and judges that the type of a command is the window area setting command 14, the element rendering command 15, or the termination command 16 (step S132).

When the type of the rendering command is judged to be the window area setting command 14 in step S132, the command interpreter 48 sets a window area included in the window area setting command to the window area register 63 (step S133). Then, the command interpreter 48 returns to step S132.

Let, for example, the rendering command data 13 include the content indicated in FIG. 2, and the command interpreter 48 judge in S132 that the rendering command data be the window area setting command 14 based on the header 17. In this case, the command interpreter 48 sets a window area (X0, X1, Y0, Y1) to the window area register 63 in step S133.

When the type of the rendering command is judged to be the element rendering command 15 in step S132, the command interpreter 48 sets the element type 26, the element areas 27 to 30 and the element address 31 included in the element rendering command 15 to the element type register 65, the element area register 66 and the element address register 67, respectively (steps S134 to S136). By this, if the acquisition of one element rendering command 15 is completed, the command interpreter 48 outputs an element rendering request notification to the renderer 49.

Let, for example, the rendering command data 13 include the content indicated in FIG. 2, and the command interpreter 48 judge in S132 that the rendering command data be the element rendering command 15 based on the header 25. In this case, the command interpreter 48 sets an element area (RX0, RX1, RY0, RY1) to the element area register 66 in step S135.

If an element rendering request notification is inputted, the renderer 49 starts the rendering processing of an element image (step S137). The element rendering processing (step S137) will be described with reference to FIG. 8.

As illustrated in FIG. 8, the renderer 49 first acquires the element image data 12 from the address which is set to the element address register 67 from the storage device 5 via the storage device interface 47 (step S141). Here, the renderer 49 adds +1 to the content of the element address register 67 every time the renderer 49 acquires the element image data 12 by 1 byte.

The renderer 49 decompresses the acquired element image data 12 in the method according to the element type 26 set by the element type register 65, thereby generating the rendering data 53 of an element image (step S142).

The renderer 49 calculates the element area 24 represented by the virtual area coordinate values on the virtual area 22 based on data stored in the window area register 63, the scroll amount register 64, and the element area register 66 (step S143).

For example, when the window area is a rectangular area (X0, X1, Y0, Y1) in the virtual area coordinate values, the scroll amount is SX in the X direction, SY in the Y direction, and the element area 24 is a rectangular area (RX0, RX1, RY0, RY1) in the relative coordinate values, the position of the element area 24 represented by the virtual area coordinate values is calculated as a rectangular area (X0+RX0+SX, X0+RX1+SX, Y0+RY0+SY, Y0+RY1+SY) in the virtual area coordinate values. FIG. 3 illustrates the element area 24 in the case that each of SX and SY is 0.

When the element area 24 according to the element rendering command 15 to be processed has an overlapping portion (area) with the VRAM area 32 (step S144; Yes), the renderer 49 outputs the rendering data 53 indicating an element image in the overlapping area to the converter 50. The converter 50, as mentioned above, converts rendering data into the VRAM data 55 (step S145). The converter 50 outputs the VRAM data 55 obtained by the conversion to the display device 4 (step S146).

After all the output (step S146) of the VRAM data 55 indicating an element image in the overlapping area with the VRAM area 32 is completed, or when there are not the VRAM area 32 and an overlapping area in the element area 24 (step S144; No), the renderer 49 outputs an element rendering end notification to the command interpreter 48 (step S147). By this, the renderer 49 ends the element rendering processing (step S137). The command interpreter 48 which has received the element rendering end notification returns to step S132.

As mentioned above, by the execution of an element rendering processing (step S137), the VRAM data 55 indicating an element image and the display position of the element image in the screen of the display 8 is generated and outputted to the display device 4.

Although not illustrated, the VRAM data acquirer 10 of the display device 4 acquires the VRAM data 55 representing the element image. Then, the VRAM data acquirer 10 stores the VRAM data 55 in the VRAM 9 such that the element image is arranged at the position on the screen of the display 8 corresponding to the position of the element area 24 in the VRAM area 32. As the result, the element image is arranged at the appropriate position by the display controller 11 and displayed on the display 8.

Thereafter, by processing the window area setting command 14 or the element rendering command 15 in a similar manner, a screen is displayed on the display 8 by displaying a plurality of element images on one window area, or by displaying an element image on another window area.

Referring back to FIG. 7, when the type of the rendering command is judged to be the termination command 16 in step S132, the command interpreter 48 sets a rendering end flag to the interruption register 68 (step S138).

If the host interface 46 detects that a rendering end flag is set by monitoring, for example, the interruption register 68, the host interface 46 outputs an interruption signal to the central processing device 6 (step S139). By this, the rendering processing device 7 ends the rendering command execution processing (step S110).

In the above, Embodiment 1 of the disclosure is described.

The present Embodiment has a constitution in which the storage device 5 storing the rendering command data 13 and the element image data 12 and the rendering processing device 7 are externally attached to the central processing device 6. A processing for screen generation which conventionally has a high processing load (setting of a pixel area taking into consideration a scroll amount, acquisition and decompression processing of pixel image data, conversion to the VRAM data 55, and output to the display device 4) is executed by the rendering processing device 7, which hardly influences the main control of the central processing device 6. The central processing device 6 only performs processings which are completed in a short time such as a processing for specifying a rendering command address according to the operation type, a processing for outputting a rendering start request to the rendering processing device 7, and an interruption clear processing after rendering end. As the result, a problem that an operation or control of a device to be controlled performed by the main control is delayed by performing a screen generate processing can be avoided.

In generally, by using a full dot liquid crystal display, a memory capacity needed for storing the rendering command data 13 and element image data 12 is increased. In the present Embodiment, since the data 12, 13 is stored in the storage device 5 and is directly acquired from the storage device 5 by the rendering processing device 7, the capacity of the ROM 35 embedded in the central processing device 6 does not need to be increased.

Therefore, a remote control device mounting a full dot liquid crystal display having a high user operability can be provided without changing the central processing device 6 conventionally adopted for a remote control device to those having a high performance and having a large capacity internal ROM. Since the central processing device 6 does not need to be changed, a lot of existing software assets can also be used. As the result, a manufacturing period can be reduced.

Further, in the present Embodiment, the central processing device 6 does not set the rendering command data 13 (various kind of information included in the rendering command data) to the rendering processing device 7, but the previously created rendering command data 13 is stored in the storage device 5. By this, the central processing device 6 just sets the address of the destination for storing the rendering command data 13 to the rendering processing device 7, and then, the display image can be changed. As the result, the amount of data outputted to the rendering processing device 7 from the central processing device 6 can be reduced, thereby reducing the processing load of the central processing device 6.

Further, in the present Embodiment, the element area (element image) 24 based on the virtual area coordinate values 18 to 21 and the relative coordinate values 27 to 30 is arranged in the virtual area 22. By this, when an operation signal for scrolling the window area 23 is received, the display image can be scrolled only by moving the window area 23 in accordance with the operation signal without changing the image of the window area 23. As the result, a scrolling processing can be executed at a high speed.

Further, in the present Embodiment, rendering conditions include the type of an operation indicated by an operation signal. This makes it possible to display a display screen according to an operation of a user on the display 8. The rendering condition also includes the type of the display image displayed on the display 8. This makes it possible to switch a display image also according to the type of the display image displayed on the display 8.

The present Embodiment may be modified as follows.

For example, in Embodiment 1, the remote control device 1 renders an image as needed when the remote control device 1 receives an operation signal based on an operation of a user. A trigger for the remote control device 1 to render an image is, however, not limited to the reception of an operation signal.

For example, when the controller 33 which executes the control application 40 satisfies a condition determined by a control logic included in the control application 40, a display image may be displayed on the display 8 as needed. Specific examples thereof include: displaying a specific display image in order to notify a user of a failure of appliances or the remote control device 1 on display 8; or displaying, when a current room temperature is displayed on the screen of the display 8, the room temperature changed in accordance with change in the room temperature on display 8.

Further, for example, in the Embodiment, a host command which sets the rendering command address includes a host command which sets a certain value to the scroll amount register 64. A method for setting the scroll amount to the scroll amount register 64 is, however, not limited thereto.

For example, a prescribed scroll amount may be included in the rendering command data 13, and the scroll amount may be set to the scroll amount register 64 by the command interpreter 48.

For example, a host command which sets a scroll amount according to an operation of a user may be outputted together with a host command which sets a rendering command address. For example, when an operation signal corresponding to a scroll within a certain time from the reception of an operation signal which satisfies rendering conditions, the communicator 36 may receive an instruction from the controller 33 and output a host command which sets a rendering command address, as well as a host command (host command which sets a scroll amount) which stores scroll amount data indicating a direction and an amount according to an operation signal in the scroll amount register 64. It is noted that the operation signal indicating a scroll suitably includes a direction and an amount of the scroll.

Modified Embodiment 1

Further, for example, in Embodiment 1, as described with reference to FIGS. 7 and 8, the VRAM data 55 is outputted for each element rendering processing (step S137) to the display device 4 as needed. It is, however, also suitable that, for example, the renderer 49 accumulates the rendering data 53 until all the element rendering command 15 included in one rendering command data 13 is executed, and thereafter, as needed, the converter 50 converts the rendering data 53 into the VRAM data 55 and outputs to the display device 4.

Figure 9:
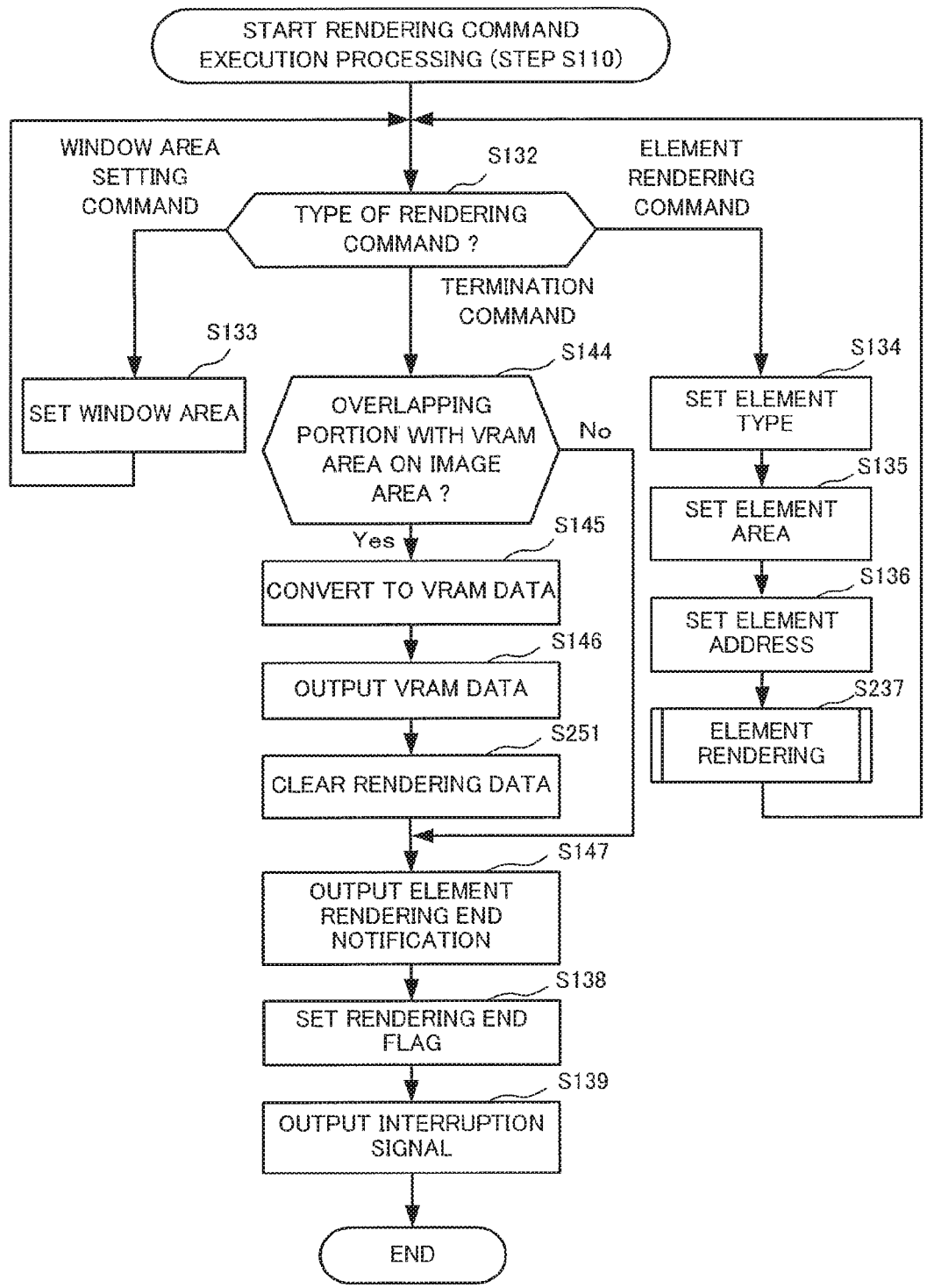
FIG. 9 is a flow chart illustrating one Modified Embodiment of the detail of the rendering command execution processing shown in FIG. 6.
Figure 10:
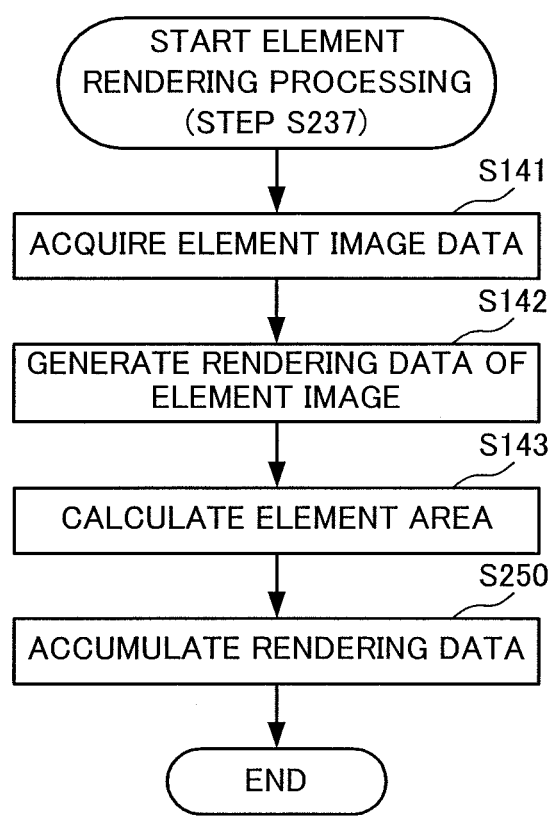
FIG. 10 is a flow chart illustrating the detail of an element rendering processing shown in FIG. 9.

FIGS. 9 and 10 illustrates one example of a flow of processings executed by the rendering processing device 7 of the present Modified Embodiment. In the rendering command execution processing (step S110), as illustrated in FIG. 9, the detail of the element rendering processing (step S237) differs. In the element rendering processing (step S237), as illustrated in FIG. 10, after the element area calculation processing (step S143), the renderer 49 accumulates the rendering data 53 including the specified element area 24 (step S250).

Referring again back to FIG. 9, when a rendering command is judged to be the termination command 16 by the command interpreter 48 (step S132; termination command), the converter 50 of the present Modified Embodiment executes from the superposition judging processing (step S144) to the VRAM data output processing (step S146), before the end interruption setting processing (step S138). Subsequently, by receiving an instruction of the converter 50, the renderer 49 clears the accumulated rendering data 53 (step S251). The renderer 49 then executes a processing for outputting an element rendering end notification (step S147).

By the present Modified Embodiment, each element is not displayed on the display 8 one by one in order, but element images included in one rendering command data 13 as a whole can be displayed on the display 8. This also has a similar effect to Embodiment 1.

Modified Embodiment 2

In Embodiment 1, the rendering command data 13 includes all of a window area (virtual area coordinate values 18 to 21) indicated by data retained by the register 45, the element type 26, the element area (relative coordinate values 27 to 30), and the element address 31. However, a part of them may be stored in the registers 63, 65 to 67 by the central processing device 6. In the present Modified Embodiment, an example in which element address data of the above group of data included in the rendering command data 13 of Embodiment 1 is stored into from the central processing device 6 to the element address register 67.

Figure 11:
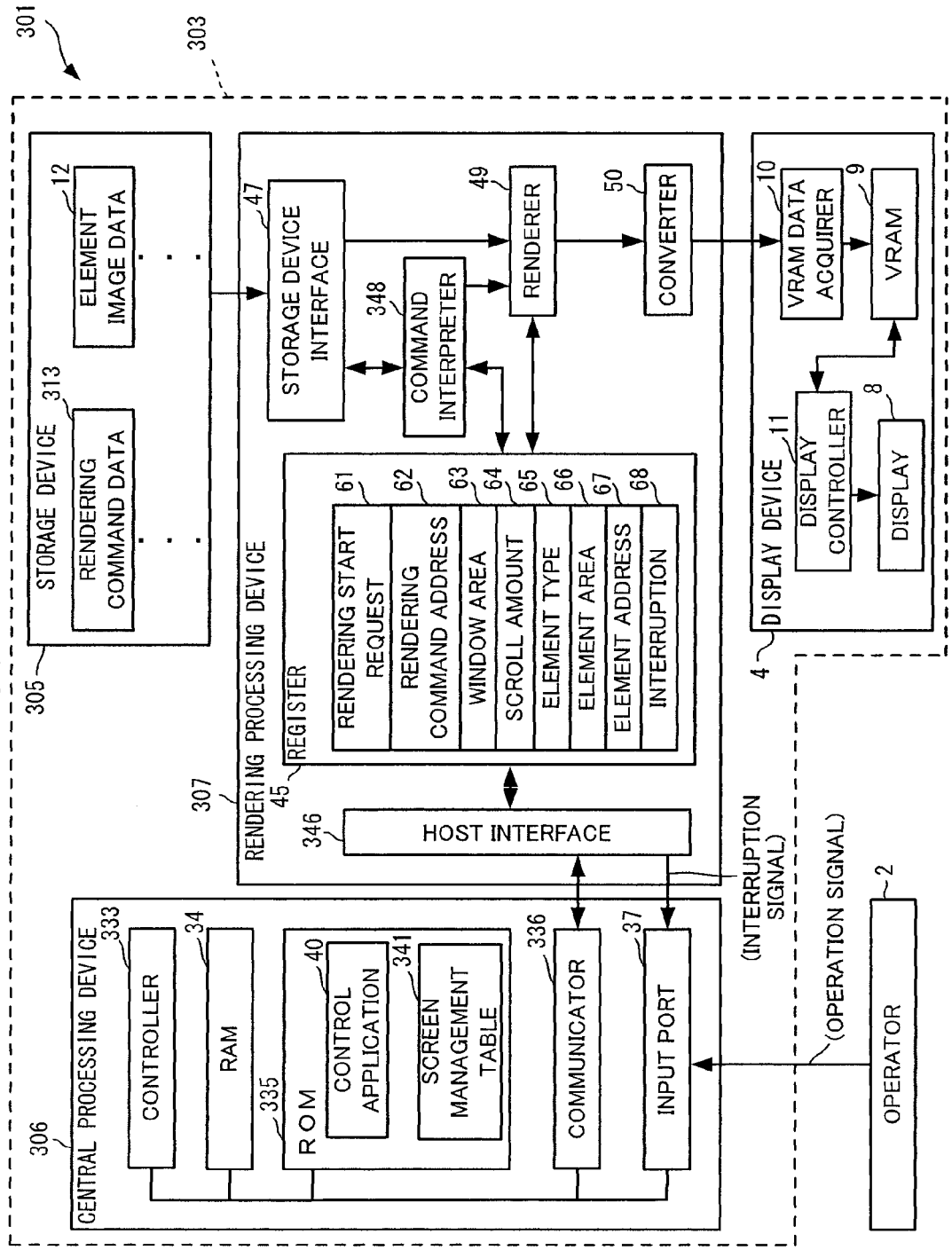
FIG. 11 is a diagram illustrating the constitution of a remote control device of Modified Embodiment 2.

The remote control device 301 according to the present Modified Embodiment, as illustrated in FIG. 11, comprises the control device 303 including the storage device 305, the central processing device 306, and the rendering processing device 307 which are different from the control device 3 of Embodiment 1.

Figure 12:
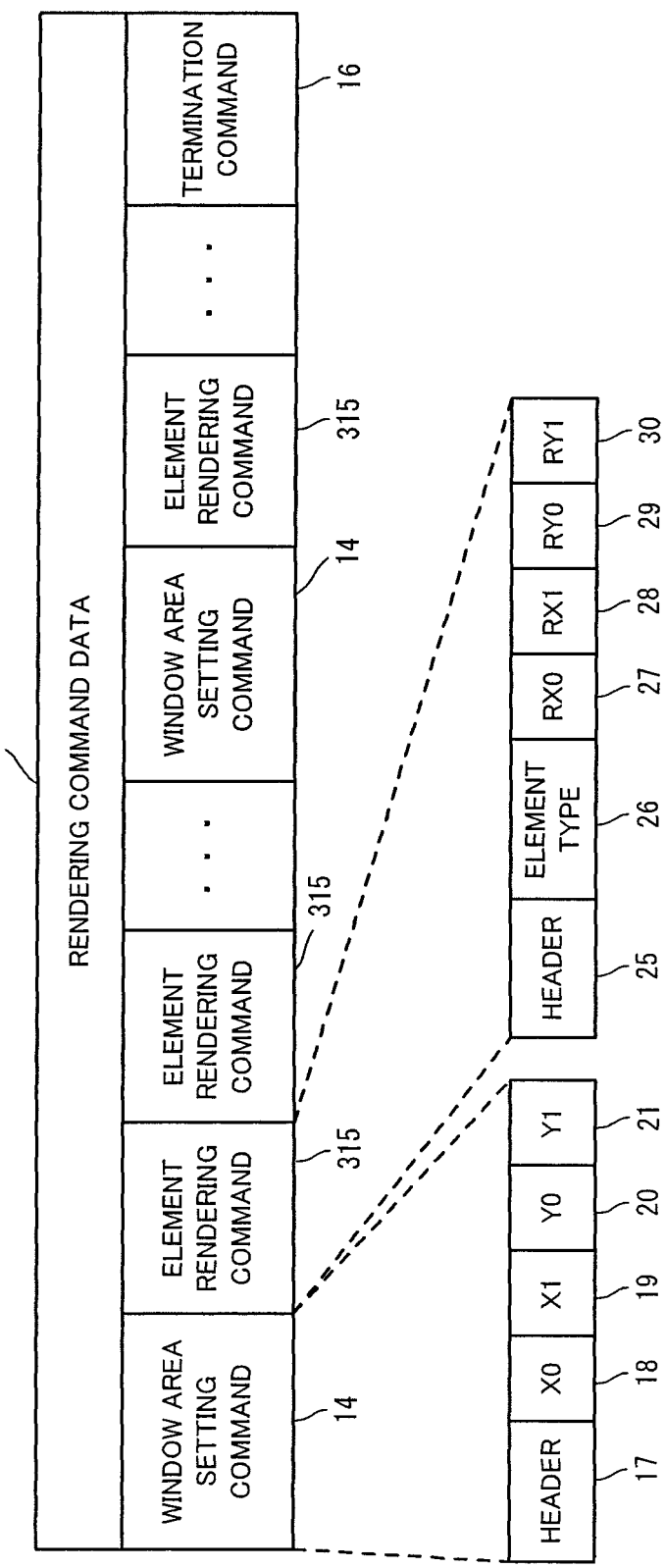
FIG. 12 is a diagram illustrating one example of rendering command data of Modified Embodiment 2.

The storage device 305 stores rendering command data 313 in place of the rendering command data 13 of Embodiment 1. The rendering command data 313 is, as illustrated in FIG. 12, different from the rendering command data 13 of Embodiment 1 in that an element rendering command 315 does not include the element address 31.

The central processing device 306 comprises a ROM 335 storing a screen management table 341, a controller 333, and a communicator 336 in place of the ROM 35 storing the screen management table 41, the controller 33, and the communicator 36 of Embodiment 1.

In the screen management table 341, as illustrated in FIG. 13, an element address as well as a rendering command address is associated with the screen number. The element address is an address in the storage device 305 of the element image data 12 indicating an element image included in a display image corresponding to the screen number.

The controller 333 specifies the element address in addition to the rendering command address by referring to the screen management table 341. Then, the controller 333 outputs an order (host command) including the specified rendering command address and element address to communicator 336.

In a similar manner to the communicator 36 of Embodiment 1, the communicator 336 receives an instruction of the controller 333 and outputs a setting order of the rendering command address to the rendering processing device 307. In addition to this, the communicator 336 outputs a host command (setting order of an element address) for setting the specified element address to the element address register 67 to the rendering processing device 307.

The rendering processing device 307 comprises a host interface 346 and a command interpreter 348 in place of the host interface 46 and command interpreter 48 of Embodiment 1.

The host interface 346 acquires a setting order of an element address in addition to data which the host interface 46 of Embodiment 1 inputs and outputs. Then, the host interface 346 sets an element address included in the acquired setting order of an element address to the element address register 67.

The command interpreter 348 sets the window area 23, the element type, and the element area 24 to the corresponding registers 63, 65, 66, respectively, by interpreting the rendering command data 313.

In the above, the constitution of the remote control device 301 of the present Modified Embodiment is described. In the following, a processing which the remote control device 301 executes is described with reference to figures.

Figure 14:
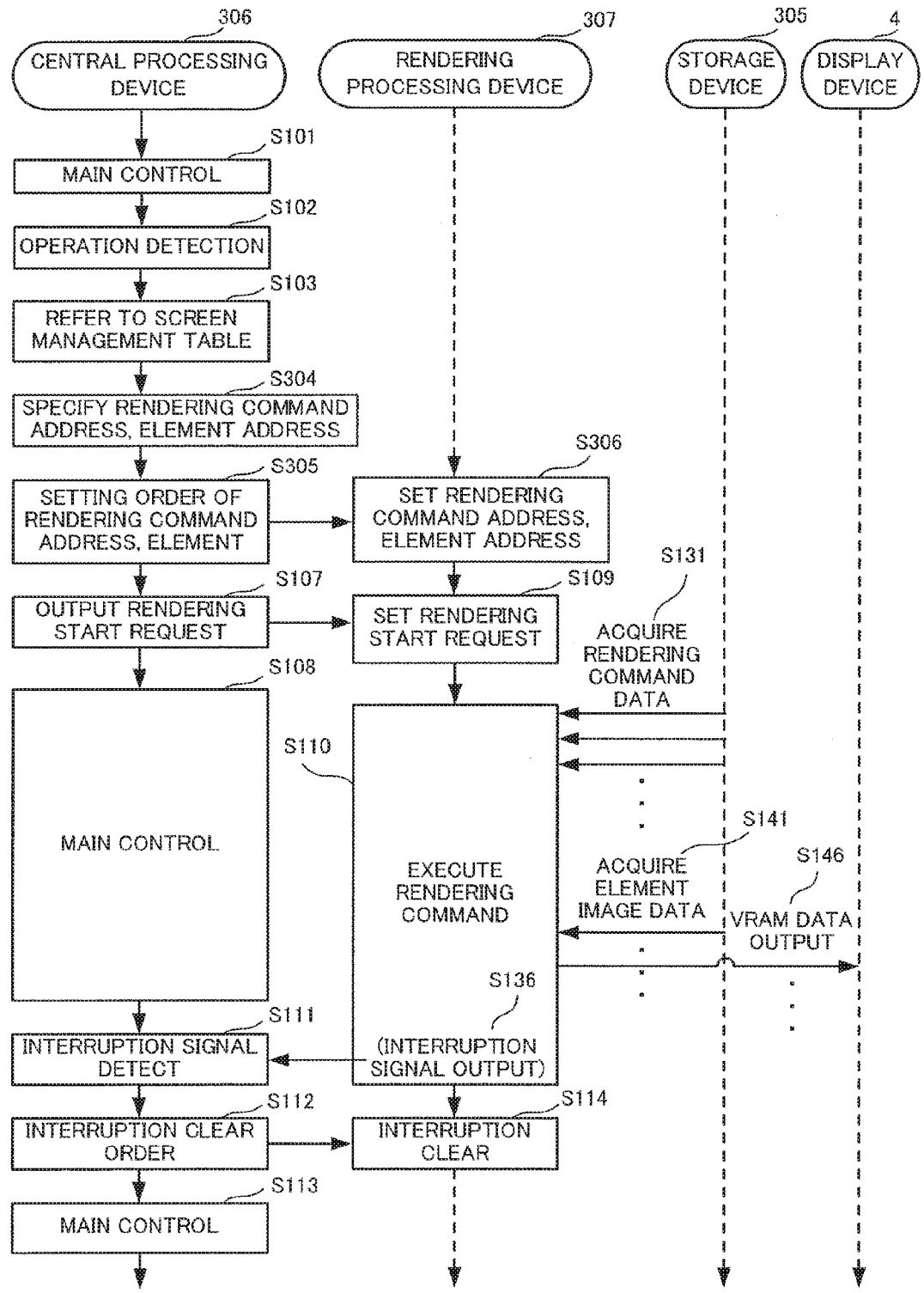
FIG. 14 is a diagram illustrating one example of a flow of processings executed by the remote control device of Modified Embodiment 2.

In the present Modified Embodiment, as illustrated in FIG. 14, after the screen management table referring processing (step S103), the central processing device 306 specifies a rendering command address and an element address by referring to the screen management table 341 (step S304). The specified element address here is an element address associated with the same screen number as the rendering command address specified in a similar manner to Embodiment 1.

The communicator 336 receives an instruction of the controller 333 and outputs a setting order of the rendering command address and a setting order of the element address to the rendering processing device 307 (step S305).

The host interface 346 of the rendering processing device 307 acquires the setting order of the rendering command address and the setting order of the element address. Then, the host interface 346 sets the rendering command address and the element address specified by the controller 333 to the rendering command address register 62 and the element address register 67, respectively (step S306).

By the present Modified Embodiment, a similar effect to Embodiment 1 is achieved. The data size of the rendering command data 313 can be made smaller than the data size of the rendering command data 13 of Embodiment 1. Accordingly, the remote control device 301 can be constituted by the storage device 305 having a storage capacity smaller than that of Embodiment 1.

Embodiment 2

In the present Embodiment, in a similar manner to the Modified Embodiment 2 of Embodiment 1, a part of window area data, element type data, element area data, and element address data included in the rendering command data 13 of Embodiment 1 is stored in a register by a central processing device. In the present Embodiment, a part of the above group of data is not include in the screen management table 341 as Modified Embodiment 2, but the central processing device executes a prescribed program to generate a part of the above group of data. In the present Embodiment, an example when element address data is generated by the central processing device is described.

Figure 15:
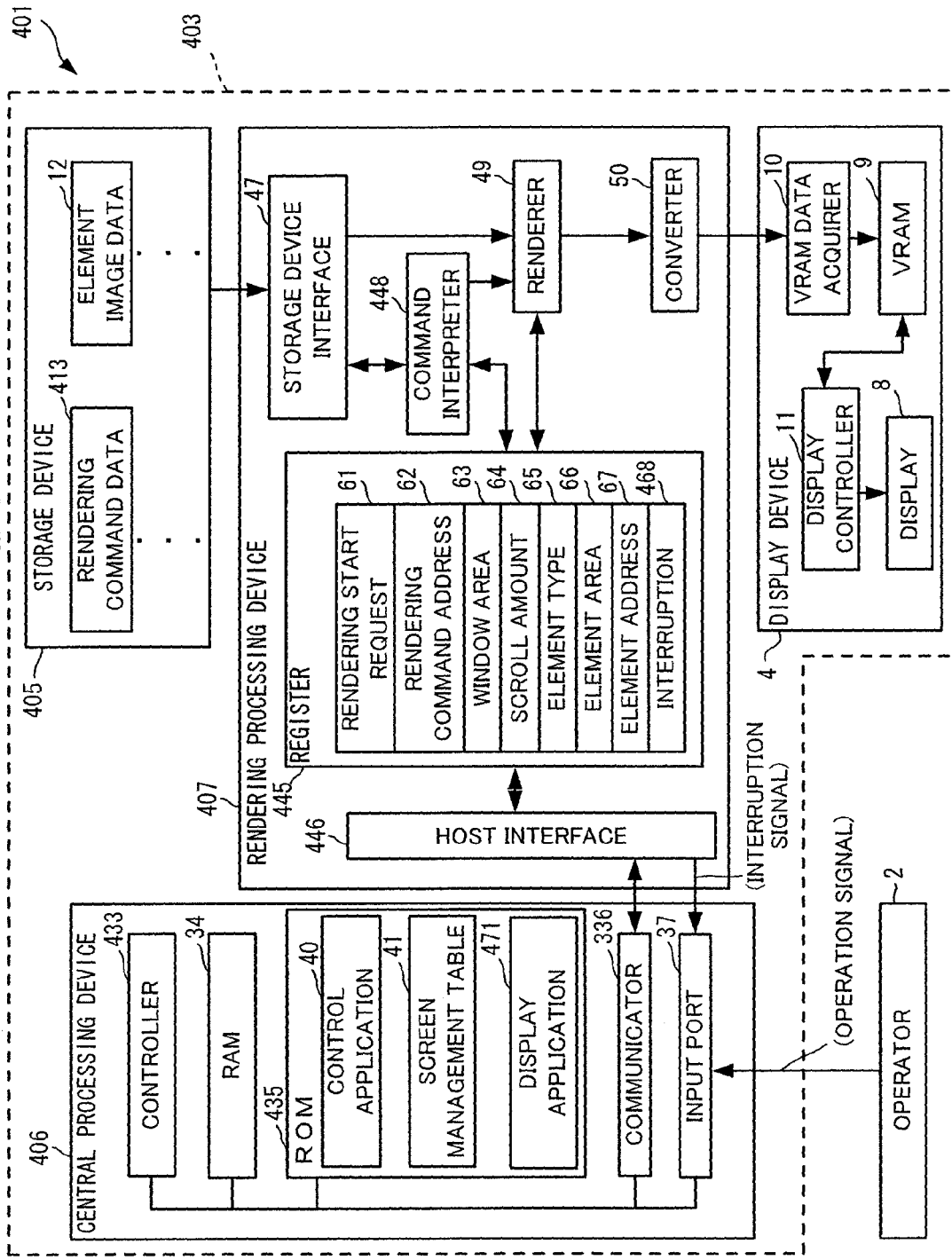
FIG. 15 is a diagram illustrating the constitution of the remote control device of Embodiment 2.

As illustrated in FIG. 15, a remote control device 401 of the present Embodiment comprises a control device 403 including a storage device 405, a central processing device 406, and a rendering processing device 407 which are different from the control device 303 of Modified Embodiment 2.

Figure 16:
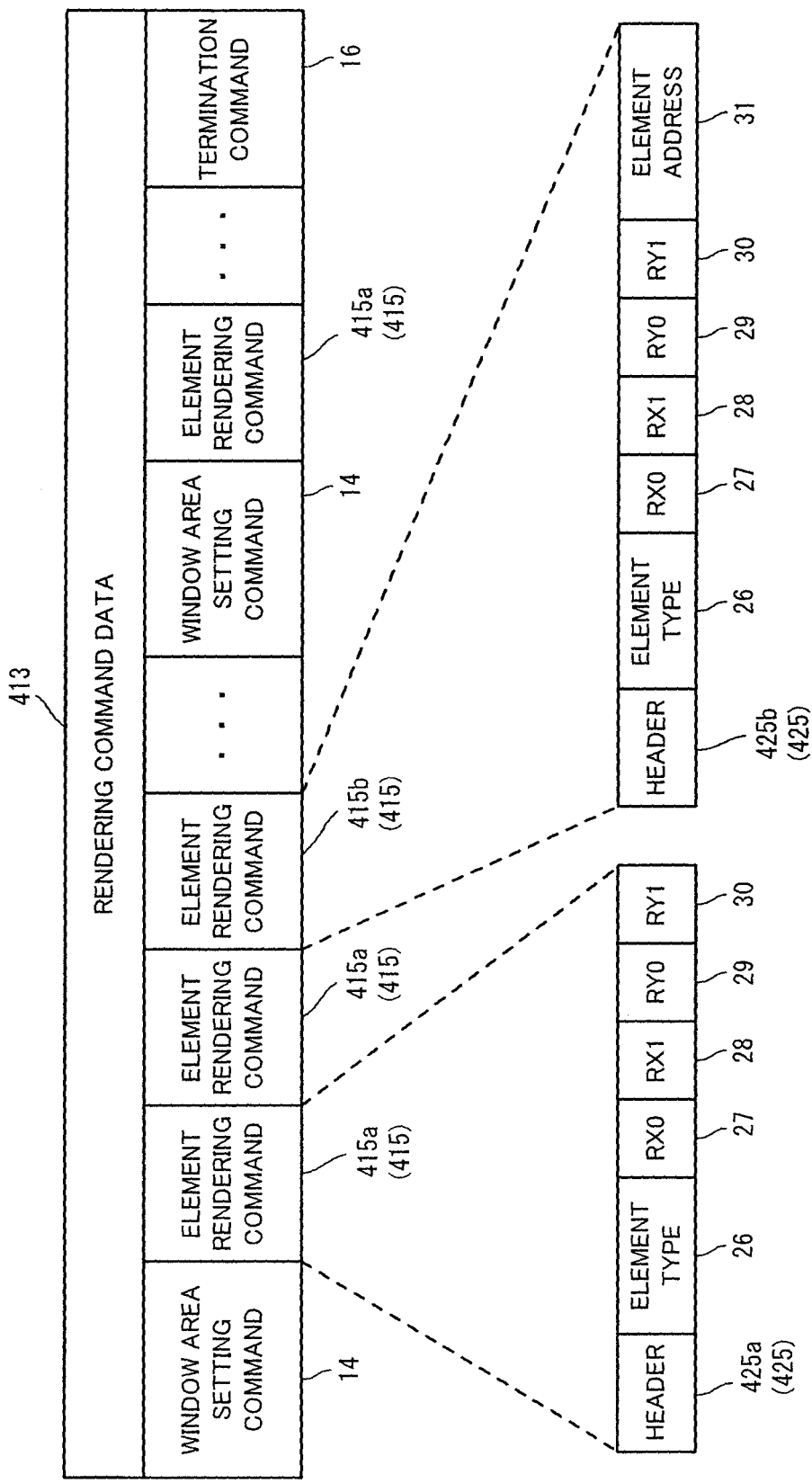
FIG. 16 is a diagram illustrating one example of rendering command data of Embodiment 2.

The storage device 405 stores rendering command data 413 in place of the rendering command data 313 of Modified Embodiment 2. As illustrated in FIG. 16, the rendering command data 413 includes element rendering commands 415a, 415b. Hereinafter, the element rendering commands 415a, 415b are generally referred to as an element rendering command 415.

Headers 425a, 425b of the element rendering command 415 include a flag (rendering interruption flag) indicating whether a setting of element address data in the element address register 67 is requested to the central processing device 406 or not. Hereinafter, the headers 425a, 425b of the element rendering command 415 are generally referred to as a header 425.

The first and the second element rendering command 415a following the first window area setting command 14 of FIG. 16 is an example in which the header 425a includes a rendering interruption flag indicating that an element address setting is requested to the central processing device 406 (for example, "1").

The third element rendering command 415b of FIG. 16 following the first window area setting command 14 of FIG. 16 is an example in which the header 425a includes a rendering interruption flag indicating that an element address setting is not requested to the central processing device 406 (for example, "0").

As illustrated in FIG. 16, the element rendering command 415a including the header 425a whose rendering interruption flag is 1 does not include the element address 31, and the element rendering command 415b including the header 425b whose rendering interruption flag is 0 includes the element address 31.

It is noted that the rendering interruption flag may be included in the header of the window area setting command 14 in place of the element rendering command 415. In this case, it is suitable that the window area setting command 14 including a rendering interruption flag indicating that an element address setting is requested to the central processing device 406 is followed by the element rendering command 315 which does not include the element address 31. Also, it is suitable that the window area setting command 14 including a rendering interruption flag indicating that an element address setting is not requested to the central processing device 406 is followed by the element rendering command 315 which includes the element address 31.

The central processing device 406 comprises a ROM 435 and a controller 433 in place of the ROM 335 and the controller 333 of Modified Embodiment 2.

The ROM 435 stores a display application 471 in addition to the control application 40 and screen management table 41 similar to Embodiment 1. The display application 471 includes a program which the controller 433 executes for setting an element address.

When "1" is set to a rendering interruption flag of the acquired interruption register 468, the central processing device 406 executes the display application 471. By this, the central processing device 406 determines an element address according to a display screen which is being rendered, the operation state of the remote control device 401, and the number of rendering interruptions occurred from the rendering start of the display screen.

In the present Embodiment, an element address is mapped to each element image and incorporated into the display application 471. Therefore, when the display application 471 is executed, the central processing device 406 determines an appropriate element address by appropriately referring to the ROM 435 or the RAM 34. It is noted that the element address may be mapped to each element image and pre-stored in the ROM 435 or the like.

The rendering processing device 407 comprises a register 445 including the interruption register 468, a host interface 446, and a command interpreter 448 in place of the register 45, the host interface 346, and the command interpreter 348 of Modified Embodiment 2.

The interruption register 468 is a register for setting a rendering interruption flag indicating that a rendering interruption signal is sent to the central processing device 406 in addition to a rendering end flag similar to Embodiment 1.

The host interface 446 inputs and outputs data similar to the host interface 346 of Modified Embodiment 2. In addition, the host interface 446 monitors the interruption register 468, and outputs an interruption signal to the central processing device 406 when, for example, a rendering end flag indicating "1" or a rendering interruption flag is set.

The command interpreter 448 sets the window area 23, the element type, the element area 24, and, as needed, an element address to corresponding registers 63, 65, 66, 67 by interpreting rendering command data 413.

In the above, the constitution of the remote control device 401 of the present Embodiment is described. In the following, a processing which the remote control device 401 executes is described with reference to figures.

Figure 17:
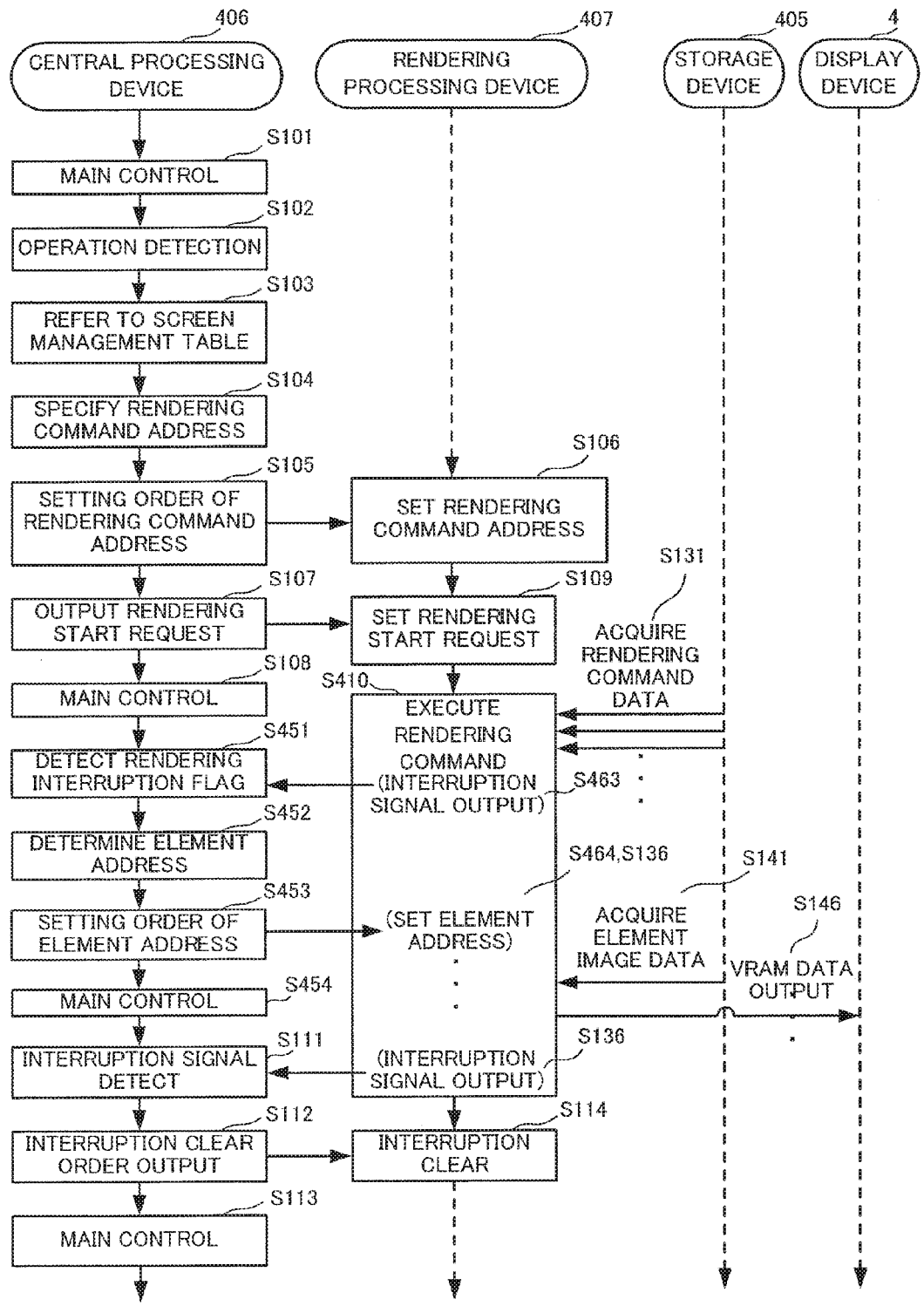
FIG. 17 is a diagram illustrating one example of a flow of processings executed by the remote control device of Embodiment 2.

In the present Embodiment, as illustrated in FIG. 17, the rendering processing device 407 sets a rendering interruption flag as needed in a rendering command execution processing (step S410) which is described in detail below, outputs an interruption signal (step S463), and interrupts the rendering command execution processing.

If the central processing device 406 detects an interruption signal outputted from the rendering processing device 407 by the input port 37, the central processing device 406 interrupts a main control processing, and outputs a host command which acquires the content of the interruption register 468 from the rendering processing device 407. By this, the central processing device 406 detects a rendering interruption flag set to the interruption register 468 (step S451).

When "1" is set to a rendering interruption flag of the acquired interruption register 468, the central processing device 406 executes the display application 471, and determines an element address according to a display screen which is being rendered, the operation state of the remote control device 401, and the number of rendering interruptions occurred from the rendering start of the display screen (step S452). It is noted that, when "1" is not set to the rendering interruption flag of the acquired interruption register 468, it is suitable that the central processing device 406 resumes the main control processing.

The central processing device 406 outputs a host command which sets the determined element address and a host command which clears a rendering interruption flag to the rendering control device 407 via the communicator 336 (step S453). Then, the central processing device 406 resumes the main control processing (step S454).

It is noted that the central processing device 406 may output a host command which sets an element address, as well as a host command which sets all registers.

If the host interface 446 of the rendering processing device 407 acquires a host command which sets an element address, the rendering processing device 407 sets an element address in the rendering command execution processing (step S410) (step S464 or S136).

Figure 18:
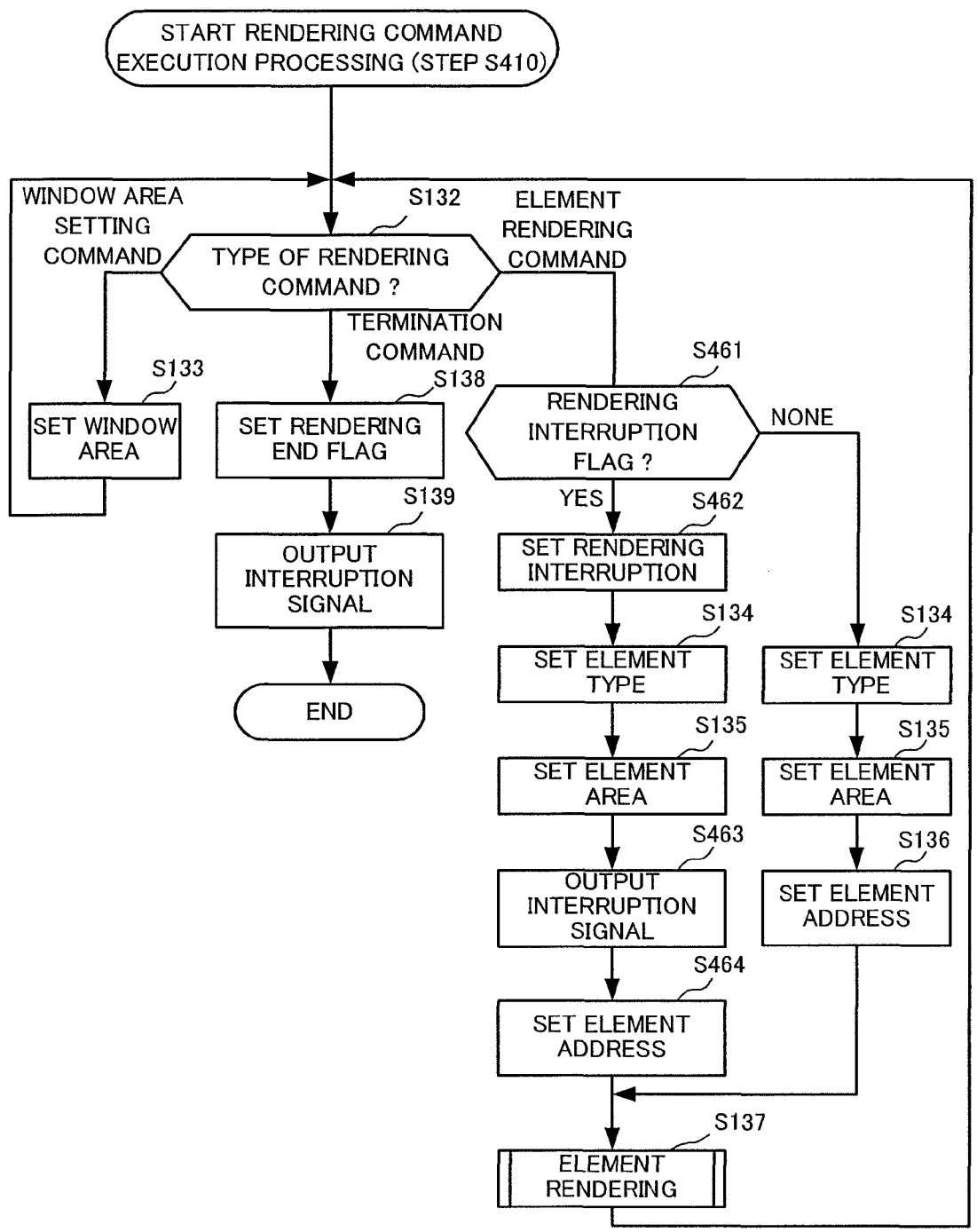
FIG. 18 is a flow chart illustrating the detail of the rendering command execution processing illustrated in FIG. 17.

The detail of the rendering command execution processing (step 410) is described with reference to FIG. 18.

In S132, when the type of a rendering command is judged to be the element rendering command 415, the command interpreter 448 judges whether there is a rendering interruption flag included in the header 425 (step S461).

When a rendering interruption flag is judged to be not included ("0" in the present Embodiment) (step S461; none), the command interpreter 448 sets element type, element area 24, and element address in order in a similar manner to Embodiment 1 (steps S134 to S136).

When a rendering interruption flag is judged to be included ("1" in the present Embodiment) (step S461; yes), the command interpreter 448 sets a rendering interruption flag to the interruption register 468 (step S462). The command interpreter 448 sets the element type and element area 24 to the element type register 65 and element area register 66, respectively (steps S134 and S135).

If the host interface 446 detects that a rendering interruption is set to the interruption register 468, the host interface 446 outputs a rendering interruption signal to the central processing device 406 (step S463). Then, the rendering processing device 407 interrupts a rendering command execution processing (step S410).

If the host interface 446 acquires a host command which sets an element address from the central processing device 406, the host interface 446 resumes the rendering command execution processing (step S410), and stores an element address included in the acquired command into the element address register 67 (step S464).

If the element address is set (step S464 or S136), the renderer 49 executes an element rendering processing (step S137). The command interpreter 348 which receives an element rendering end notification from the renderer 49 returns to step S132.

In the above, Embodiment 2 of the disclosure is described.

By the present Embodiment, a similar effect to Embodiment 1, in particular, the following effect, is achieved.

On the remote control device 401 of a common air conditioner, a target temperature of, for example, a cooling operation is displayed. If the target temperature is changed, the target temperature after the change is displayed on a window having the same layout as that before the target temperature is changed. Since, in Embodiment 1, the rendering command data 13 corresponding to the display image of each target temperature is stored in the storage device 5, a large amount of rendering command data 13 is needed.

In contrast, the central processing device 406 of the present Embodiment determines an element address according to the number of a screen which is being rendern, the operation state of the remote control device 401, and the number of rendering interruptions occurred. As the result, for example, when a target temperature is displayed, if the target temperature displayed on the remote control device 401 is "20° C.", the displayed target temperature can be freely changed by setting the element address storing an image (character), "2", at the first interruption, and the element address storing an image (character), "0", at the second interruption to the rendering processing device 407.

Since the "° C." is displayed on a fixed position, the "° C." can be rendern without particularly instructing an element address from the central processing device 406 by indicating the destination where the element image data of the "° C." is stored at the element address 31 in the element rendering command without setting a rendering interruption flag in the element rendering command 415b where the "° C." is rendern (for example, setting the rendering interruption flag of the header 425b to "0" or "Null").

Accordingly, the rendering processing device 407 outputs an interruption signal during the rendering command execution processing, and the central processing device 406 sets register content such as an element address, whereby rendering command data does not need to be stored in the storage device 405 for each target temperature on a screen on which only a part of the display content such as a target temperature changes, which makes it possible to reduce the storage capacity needed for the storage device 405.

In the above, Embodiment and Modified Embodiment of the disclosure is described. The disclosure is not limited to the Embodiment and Modified Embodiments. For example, a mode in which each Embodiment and each Modified Embodiment are appropriately combined, or an equivalent technical scope is also included in the disclosure.

The present application claims the priority of Japanese Patent Application No. 2011-267504 including DESCRIPTION, CLAIMS, RENDERINGS, and ABSTRACT filed on Dec. 7, 2011. The contents disclosed in the original patent application is incorporated herein in its entirety by reference.

REFERENCE SIGNS LIST 1, 301, 401 Remote control device,
Operator,
3, 303 Control device,
4 Display device,
5, 305, 405 Storage device,
6, 306, 406 Central processing device,
7, 307, 407 Rendering processing device,
8 Display,
9 VRAM,
10 VRAM data acquirer,
11 Display controller,
33, 333, 433 Controller,
34 RAM,
35, 335, 435 ROM,
36, 336 Communicator,
37 Input port,
45 Register,
46, 346, 446 Host interface,
47 Storage device interface,
48, 348, 448 Command interpreter,
49 Renderer,
50 Converter,
61 Rendering start request register,
62 Rendering command address register,
63 Window area register,
64 Scroll amount register,
65 Element type register,
66 Element area register,
67 Element address register,
68, 468 Interrupt register

The invention claimed is:

1. A rendering processing device comprising:
an interface that acquires, from a central processing device, rendering command specifying data for specifying rendering command data in a storage device, the storage device prestoring the rendering command data, the rendering command data being used for generating a rendering command;
an interpreter that interprets the rendering command data specified by the rendering command specifying data acquired by the interface, to thereby extract data for generating the rendering command; and
a renderer that executes the rendering command generated based on the data extracted by the interpreter, to thereby generate rendering data for displaying a display image on a display device, wherein
the rendering command specifying data indicates an address where the rendering command data is stored in the storage device;
the rendering command data includes:
element specifying data for specifying element image data that indicates an element image that is an element included in the display image, the storage device further prestoring the element image data, and
element arrangement data for specifying a position where the element image is arranged in a virtual area that is a virtual area that the rendering processing device uses for displaying the display image on the display device;
the interpreter extracts the element specifying data and the element arrangement data as the data for generating the rendering command; and
the renderer generates the rendering data that includes the element image arranged based on the element specifying data and the element arrangement data extracted by the interpreter, when the element image arranged based on the element arrangement data extracted by the interpreter is included in a display area of the virtual area, the display area corresponding to the display image displayed by the display device.

2. The rendering processing device according to claim 1, wherein
the rendering command data includes all data for generating the rendering command.

3. The rendering processing device according to claim 1, wherein
the element arrangement data includes window area data indicating a position where a window area is set in the virtual area, and relative position data indicating a position where the element image is arranged in the window area.

4. The rendering processing device according to claim 1, wherein
the interface acquires the rendering command specifying data from the central processing device when the interface receives an operation signal including a type of an operation of a user.

5. The rendering processing device according to claim 4, wherein
the interface acquires, from the central processing device, the rendering command specifying data that corresponds to a combination of the type of an operation and a type of a display image displayed on the display device.

6. The rendering processing device according to claim 4, wherein,
when a button displayed on the display device is pressed with a touch panel, the interface receives the operation signal that indicates the press of the button.

7. The rendering processing device according to claim 1, further comprising
a converter that converts a data format of the rendering data generated by the renderer to thereby generate display data that indicates the display image.

8. A rendering processing device comprising:
an interface that acquires, from a central processing device, rendering command specifying data for specifying rendering command data in a storage device, the storage device prestoring the rendering command data, the rendering command data being used for generating a rendering command;

an interpreter that interprets the rendering command data specified by the rendering command specifying data acquired by the interface, to thereby extract data for generating the rendering command; and a renderer that executes the rendering command generated based on the data extracted by the interpreter, to thereby generate rendering data for displaying a display image on a display device, wherein:

the rendering command specifying data indicates an address where the rendering command data is stored in the storage device, the rendering command data includes a part of data for generating the rendering command, and a rendering interruption flag indicating that the remaining part of data for generating the rendering command is acquired from the central processing device, the interpreter extracts a part of the data for generating the rendering command and causes the interface to output a rendering interruption signal that requests the remaining part of the data for generating the rendering command, the interface acquires the remaining part of the data for generating the rendering command from the central processing device, and the renderer executes a rendering command generated based on the part of the data for generating a rendering command extracted by the interpreter and the remaining part of the data for generating a rendering command acquired by the interface, to generate the rendering data.

9. The rendering processing device according to claim 8, wherein the part of the data for generating the rendering command is element arrangement data for arranging the element image in a virtual area that is a virtual area that the rendering processing device uses for generating display data, and the remaining part of the data for generating the rendering command is element specifying data for specifying the element image data in the storage device that further prestores the element image data, and the renderer generates the rendering data that includes the element image arranged based on the element specifying data extracted by the interpreter and the element arrangement data acquired by the interface, when the element image that is arranged based on the element arrangement data acquired by the interface is included in a display area of the virtual area, the display area corresponding to the display image displayed by the display device and the arranged element image.

10. A control device comprising
a rendering processing device;
a storage device; and
a central processing device,
the rendering processing device comprising
an interface that acquires, from the central processing device, rendering command specifying data for specifying rendering command data in the storage device, the storage device prestoring the rendering command data, the rendering command data being used for generating a rendering command;
an interpreter that interprets the rendering command data specified by the rendering command specifying data acquired by the interface, to thereby extract data for generating the rendering command; and
a renderer that executes the rendering command generated based on the data extracted by the interpreter, to thereby generate rendering data for displaying a display image on a display device, wherein
the rendering command specifying data indicates an address where the rendering command data is stored in the storage device;
the rendering command data includes:
element specifying data for specifying element image data that indicates an element image that is an element included in the display image, the storage device further prestoring the element image data, and
element arrangement data for specifying a position where the element image is arranged in a virtual area that is a virtual area that the rendering processing device uses for displaying the display image on the display device;
the interpreter extracts the element specifying data and the element arrangement data as the data for generating the rendering command; and
the renderer generates the rendering data that includes the element image arranged based on the element specifying data and the element arrangement data extracted by the interpreter, when the element image arranged based on the element arrangement data extracted by the interpreter is included in a display area of the virtual area, the display area corresponding to the display image displayed by the display device.

11. A remote control device comprising:
a control device comprising
a rendering processing device;
a storage device; and
a central processing device,
the rendering processing device comprising:
an interface that acquires, from the central processing device, rendering command specifying data for specifying rendering command data in the storage device, the storage device prestoring the rendering command data, the rendering command data being used for generating a rendering command;
an interpreter that interprets the rendering command data specified by the rendering command specifying data acquired by the interface, to thereby extract data for generating the rendering command; and
a renderer that executes the rendering command generated based on the data extracted by the interpreter, to thereby generate rendering data for displaying a display image on a display device, wherein
the rendering command specifying data indicates an address where the rendering command data is stored in the storage device;
the rendering command data includes:
element specifying data for specifying element image data that indicates an element image that is an element included in the display image, the storage device further prestoring the element image data, and
element arrangement data for specifying a position where the element image is arranged in a virtual area that is a virtual area that the rendering processing device uses for displaying the display image on the display device;

the interpreter extracts the element specifying data and the element arrangement data as the data for generating the rendering command; and the renderer generates the rendering data that includes the element image arranged based on the element specifying data and the element arrangement data extracted by the interpreter, when the element image arranged based on the element arrangement data extracted by the interpreter is included in a display area of the virtual area, the display area corresponding to the display image displayed by the display device; and an operator that, when a user performs an operation, outputs an operation signal that indicates a type of the operation.

\* \* \* \* \*